US012803638B2

(12) United States Patent
Kim et al.

(10) Patent No.: US 12,803,638 B2
(45) Date of Patent: Nov. 17, 2026

(54) BASE STATION AND USER EQUIPMENT PERFORMING MULTIPLE INPUT AND MULTIPLE OUTPUT COMMUNICATION, AND OPERATING METHOD THEREOF

(71) Applicant: SAMSUNG ELECTRONICS CO., LTD., Suwon-si (KR)

(72) Inventors: Leechun Kim, Suwon-si (KR); Kwonyeol Park, Suwon-si (KR); Yookeun Kang, Suwon-si (KR); Sanghyun Lee, Suwon-si (KR); Seongho Hur, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 643 days.

(21) Appl. No.: 18/197,874

(22) Filed: May 16, 2023

(65) Prior Publication Data

US 2024/0048208 A1 Feb. 8, 2024

(30) Foreign Application Priority Data

Aug. 4, 2022 (KR) ........................ 10-2022-0097573

(51) Int. Cl.
*H04B 7/06* (2006.01)
*H04B 7/0417* (2017.01)
*H04B 7/0452* (2017.01)

(52) U.S. Cl.
CPC ......... *H04B 7/0639* (2013.01); *H04B 7/0417* (2013.01); *H04B 7/0452* (2013.01); *H04B 7/0632* (2013.01)

(58) Field of Classification Search
CPC .. H04B 7/0639; H04B 7/0417; H04B 7/0452; H04B 7/0632; H04B 7/0481;
(Continued)

(56) References Cited

U.S. PATENT DOCUMENTS 8,914,015 B2 12/2014 Kim et al.
2008/0132281 A1 6/2008 Kim et al.
(Continued)

FOREIGN PATENT DOCUMENTS

CN 101615984 B 3/2013
KR 10-1131753 B1 4/2012

OTHER PUBLICATIONS

Alcatel-Lucent, "Best Companion" reporting for improved single-cell MU-MIMO pairing, 3GPP TSG RAN WG1 #56 Meeting, R1-090926 (Year: 2009).*
(Continued)

*Primary Examiner* — Ayaz R Sheikh
*Assistant Examiner* — Mang Boi Thawng
(74) *Attorney, Agent, or Firm* — Sughrue Mion, PLLC

(57) ABSTRACT

A method of a base station communicating with a plurality of User Equipments (UEs), includes: identifying a number of activated UEs from among the plurality of UEs; selecting, among a plurality of feedback schemes, a feedback scheme supporting a highest data throughput at the identified number of activated UEs with reference to history information; determining (i) a number of UEs in a companion group and (ii) a codebook size, the number of UEs in the companion group and the codebook size being corresponding to the selected feedback scheme; and performing Multiple Input and Multiple Output (MIMO) communication with the activated UEs based on the determined number of UEs in the companion group and the determined codebook size.

20 Claims, 25 Drawing Sheets

(58) Field of Classification Search
CPC .. H04B 7/0626; H04B 7/0636; H04B 7/0482; H04B 7/063; H04B 7/0478
See application file for complete search history.

(56) References Cited

U.S. PATENT DOCUMENTS

| | | | | |
|---|---|---|---|---|
| 2010/0093361 | A1 | 4/2010 | Sohn et al. | |
| 2011/0255613 | A1 | 10/2011 | Xia et al. | |
| 2012/0106470 | A1 | 5/2012 | Clerckx et al. | |
| 2014/0269395 | A1 | 9/2014 | Chen et al. | |
| 2018/0063826 | A1 | 3/2018 | Kim et al. | |
| 2018/0076943 | A1 * | 3/2018 | Clerckx | H04B 7/065 |
| 2021/0345399 | A1 | 11/2021 | Levy et al. | |

OTHER PUBLICATIONS

Alcatel-Lucent, UE PMI feedback signalling for user pairing/coordination, 3GPP TSG RAN WG1 #54bis, R1-083759 (Year: 2008).*
Kim et al., "Performance of Limited Feedback for Best Companion Grouping in Multi-user MIMO System", 2022 IEEE 95th Vehicular Technology Conference: (VTC2022-Spring) (Year: 2022).*
Kim et al., "Dynamic Feedback Selection Scheme for User Scheduling in Multi-user MIMO Systems", The Journal of Korean Institute of Communications and Information Sciences ' 15-04 vol. 40 No. 04 (Year: 2015).*
Huawei et al., "CSI Feedback Enhancements", 3GPP TSG RAN WG1 Meeting #10bis-e, Apr. 7, 2021, 18 total pages, XP052177072.
Communication dated Jan. 8, 2024. issued by European Patent Office in European Patent Application No. 23189501.2.

* cited by examiner

FIG. 9

TB1

| Feedback overhead (Q bits) | Scheme Index (S) | Feedback scheme (N,M,F) |
|---|---|---|
| Q = 10 (bits) | 1 | (1,1,16) |
| | 2 | (2, 1, 8) |
| | 3 | (2, 1, 4) |
| | 4 | (3, 1, 4) |

FIG. 11

TB2

| Feedback scheme (N,M,F) | Number of active UEs | Scheme Index (S) | Accumulated average data throughput | Pass/Fail |
|---|---|---|---|---|
| (1,1,16) | 1 | 1 | THP11 | Pass |
| | 2 | | THP21 | Pass |
| | 3 | | THP31 | Pass |
| | 4 | | - | Fail |
| (2,1,8) | ~~1~~ | 2 | - | Fail |
| | ~~2~~ | | - | Fail |
| | 3 | | THP32 | Pass |
| | 4 | | THP42 | Pass |
| (2,1,4) | ~~1~~ | 3 | - | Fail |
| | 2 | | THP23 | Pass |
| | 3 | | THP33 | Pass |
| | 4 | | THP43 | Pass |
| (3,1,4) | ~~1~~ | 4 | - | Fail |
| | ~~2~~ | | - | Fail |
| | 3 | | THP34 | Pass |
| | 4 | | THP44 | Pass |

FIG. 14

TB3

| Feedback overhead (Q bits) (based on DFS) | Scheme Index (S) | Feedback scheme (N,M,F) |
|---|---|---|
| Q = 8 (bits) | 1 | (1,1,16) |
| | 2 | (2, 1, 8) |
| Q = 10 (bits) | 1 | (1,1,16) |
| | 2 | (2,1,8) |
| | 3 | (2,1,4) |
| Q = 12 (bits) | 1 | (1,1,16) |
| | 2 | (2,1,16) |
| | 3 | (2,1,8) |
| | 4 | (2,2,4) |
| | 5 | (3,1,4) |
| | 6 | (4,1,4) |

BASE STATION AND USER EQUIPMENT PERFORMING MULTIPLE INPUT AND MULTIPLE OUTPUT COMMUNICATION, AND OPERATING METHOD THEREOF

CROSS-REFERENCE TO RELATED APPLICATION

This application is based on and claims priority under 35 U.S.C. § 119 to Korean Patent Application No. 10-2022-0097573, filed on Aug. 4, 2022, in the Korean Intellectual Property Office, the disclosure of which is incorporated by reference herein in its entirety.

BACKGROUND

1. Field

The present disclosure relates to wireless communication, and more particularly, to a base station for performing multiple input/multiple output (MIMO) communication, a user equipment, and a method thereof

2. Description of Related Art

Next-generation communication systems, such as New Radio (NR) communication systems, have been developed to meet the explosively increasing demand for wireless data traffic due to the commercialization of Long Term Evolution (LTE) communication systems and the increase in multimedia services.

To increase the data transmission rate, the NR communication systems have proposed communication in an ultra-high frequency (mmWave) band, and to decrease propagation loss of the radio waves and increase the transmission distance in the mmWave band, the beamforming, array antenna, analog beamforming large scale antenna, MIMO communication technologies are discussed in the NR communication systems. Specifically, the MIMO communication technologies have proposed massive MIMO, full dimensional MIMO, etc.

When Multiple User-MIMO (MU-MIMO) communication for user equipments included in a companion group is performed, the number of user equipments included in the companion group has been limited to a specific number due to a communication performance degradation issue.

SUMMARY

The present disclosure provides a base station, a user equipment (hereinafter, referred to as a UE), and a method thereof, which can improve resource utilization efficiency in Multi-User-Multiple Input/Multiple Output (MU-MIMO) communication and ensure high communication performance, by increasing the number of UEs included in a companion group.

According to an aspect of the present disclosure, a method of a base station communicating with a plurality of UEs, includes: identifying a number of activated UEs from among the plurality of UEs; selecting, among a plurality of feedback schemes, a feedback scheme supporting a highest data throughput at the identified number of activated UEs with reference to history information; determining (i) a number of UEs in a companion group and (ii) a codebook size, the number of UEs in the companion group and the codebook size being corresponding to the selected feedback scheme; and performing Multiple Input and Multiple Output (MIMO) communication with the activated UEs based on the determined number of UEs in the companion group and the determined codebook size.

According to another aspect of the present disclosure, a method of a UE communicating with a base station, includes: receiving information about a feedback scheme from the base station; generating at least one Precoding Matrix Indicator (PMI) belonging to a precoding matrix set corresponding to a codebook size based on the feedback scheme, and corresponding to a number of activated UEs based on the feedback scheme; generating a Channel Quality Indicator (CQI) corresponding to the at least one PMI; and transmitting feedback including the at least one PMI and the CQI to the base station.

According to another aspect of the present disclosure, a UE includes: a transceiver configured to transmit and receive a Radio Frequency (RF) signal to and from a base station; and a processor. The processor is configured to: generate at least one PMI belonging to a precoding matrix set corresponding to a codebook size based on a feedback scheme, and corresponding to a number based on the feedback scheme based on information about a feedback scheme received from the base station, and generate a CQI corresponding to the at least one PMI, and control the transceiver to transmit feedback including the plurality of PMIs and the CQI to the base station.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 9 is a diagram illustrating a first table in which a plurality of feedback schemes are organized according to an embodiment;

FIG. 11 is a diagram illustrating a second table in which history information is organized according to an embodiment;

FIG. 14 is a diagram illustrating a third table in which history information is organized according to an embodiment;

DETAILED DESCRIPTION

Figure 1:
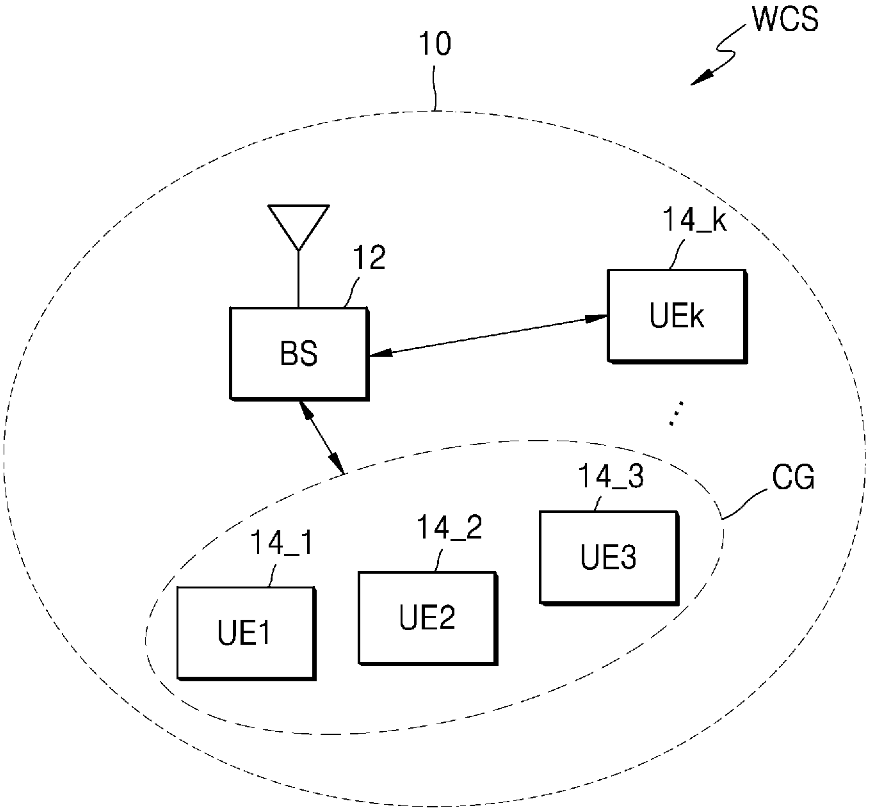
FIG. 1 is a block diagram illustrating a wireless communication system according to an embodiment.

FIG. 1 is a block diagram illustrating a Wireless Communication System (WCS) according to an embodiment. Hereinafter, embodiments of the present disclosure are described based on a New Radio (NR) network-based wireless communication system (WCS network), particularly, the 3rd Generation Partnership Project (3GPP) release, but the technical idea of the present disclosure is not limited to NR networks.

The technical idea of the present disclosure may be applied to other wireless communication systems having similar technical backgrounds or channel settings, for example, a cellular communication system, such as next-generation communication, such as Long Term Evolution (LTE), LTE-Advanced (LTE-A), Wireless Broadband (WiBro), Global System for Mobile Communication (GSM), 6G, or the like, or a short-range communication system, such as Bluetooth and Near Field Communication (NFC).

Moreover, various functions described below may be implemented or supported by artificial intelligence technology or one or more computer programs, each of which consists of computer-readable program code and is embodied in a computer-readable medium. The terms "application" and "program" refer to one or more computer programs, software components, instruction sets, procedures, functions, objects, classes, instances, related data, or parts of them suitable for implementation of suitable computer-readable program code. The term "computer-readable program code" includes all types of computer code, including source code, object code, and execution code. The term "computer-readable media" includes any type of media that may be accessed by a computer, such as Read Only Memory (ROM), Random Access Memory (RAM), hard disk drives, Compact Discs (CDs), Digital Video Discs (DVDs), or any other type of memory. A "non-transitory" computer-readable medium excludes wired, wireless, optical, or other communication links that transmit transitory electrical or other signals. A non-transitory computer-readable medium includes media where data can be permanently stored and media where data can be stored and later overwritten, such as a rewritable optical disc or an erasable memory device.

In embodiments of the present disclosure described below, a hardware approach will be described as an example. However, since the embodiments of the present disclosure include technology that uses both hardware and software, the embodiments of the present disclosure do not exclude a software-based approach.

In FIG. 1, the WCS may include a base station 12 and a first UE 14_1 to a kth UE 114_*k*. The base station 12 may generally refer to a fixed station communicating with a first base station 12_1 to a k-th base station 12_*k* and/or other base stations, and may exchange control information and signals by communicating with the first base station 12_1 to the k-th base station 12_*k* and/or the other base stations. For example, the base station 12 may be referred to as a node B, an evolved-node B (eNB), a next generation node B (gNB), a sector, a site, a Base Transceiver System (BTS), an Access Point (AP), a relay node, a Remote Radio Head (RRH), a Radio Unit (RU), a wireless device, a device, or the like.

The first UE 14_1 to the K-th UE 14_*k* may be fixed or mobile and may refer to any devices capable of communicating with the base station 12 to transmit and receive data and/or control information. For example, the User Equipment 14 (hereinafter, "UE") may be referred to as a terminal, a terminal equipment, a Mobile Station (MS), a Mobile Terminal (MT), a User Terminal (UT), a Subscriber Station (SS), a wireless communication device, a wireless device, a device, a handheld device, or the like. The first UE 14_1 to the K-th UE 14_*k* in FIG. 1 are in a coverage 10 of the base station 12 and are activated, and deactivated UEs may further be in the coverage 10. In the present disclosure, an activated UE may refer to a UE having a state in which communication with the base station 12 may be performed.

In an embodiment, the base station 12 may identify the number of the first UE 14_1 to the K-th UE 14_*k*, and select a feedback scheme expected to support a highest data throughput in the identified number by In history information among a plurality of feedback schemes.

In an embodiment, the history information may include at least one of pass/fail information on a plurality of feedback schemes and information on an accumulated average data throughput of the passed feedback schemes by the number of UEs. In an embodiment, the base station 12 may select the feedback scheme having the highest value among the accumulated average data throughput of the feedback schemes passed in the number of the first UE 14_1 to the K-th UE 14_*k* as a feedback scheme expected to support a highest data throughput.

In addition, in an embodiment, the base station 12 may generate history information while communicating with the activated UEs including the first UE 14_1 to the K-th UE 14_*k* in the coverage 10 until a predetermined condition is satisfied. Specific embodiments of the history information will be described later in FIGS. 11 and 12, etc. However, this is only an example and not limited thereto, and the base station 12 may select an optimal feedback scheme according to the number of activated UEs, for example, through artificial intelligence based on machine learning.

In an embodiment, the base station 12 may determine the number of UEs of a companion group CG and a codebook size based on the selected feedback scheme. In the present disclosure, the codebook size may mean the number of precoding matrices included in a precoding matrix set used by the base station 12.

The base station 12 may perform Multiple Input and Multiple Output (MIMO) communication with the first UE 14_1 to the K-th UE 14_*k*, based on the determined number of UEs of the companion group CG and the determined codebook size. In the present disclosure, the feedback scheme is defined as the number of UEs in the companion group CG and the codebook size, and may relate to a configuration of feedback required by the base station 12 to the UE.

For example, when the number of UEs in the companion group CG in the feedback scheme selected from the base station 12 is three and the codebook size is four, the base station 12 may receive Precoding Matrix Indicators (PMIs) indicating three precoding matrices in a precoding matrix set consisting of four precoding matrices from each of the first UE 14_1 to the K-th UE 14_*k*. That is, the number of UEs in the companion group CG may be the same as the number of PMIs generated from the UEs.

In an embodiment, a plurality of feedback schemes may decrease in codebook size as the number of UEs in the companion group CG increases. For example, the plurality of feedback schemes may include first and second feedback schemes. When the number of UEs in the companion group CG of the first feedback scheme is greater than the number of UEs in the companion group CG of the second feedback scheme, the codebook size of the first feedback scheme may be less than the codebook size of the second feedback scheme. In this way, the base station 12 selects one of the plurality of feedback schemes to reduce the codebook size when the number of UEs in the companion group CG is large, to thereby increase the probability that the first UE 14_1 to the K-th UE 14_*k* are grouped into the companion group CG. Details of the plurality of feedback schemes will be described later with reference to FIGS. 7A to 7C.

In an embodiment, the base station 12 may transmit information on the selected feedback scheme to the first UE 14_1 to the K-th UE 14_*k*. Each of the first UE 14_1 to the K-th UE 14_*k* may belong to a set of precoding matrices according to a codebook size coinciding with the selected feedback scheme based on information on the selected feedback scheme, and may generate at least one PMI corresponding to the number coinciding with the selected feedback scheme.

For example, when the number of UEs in the companion group CG is three in the selected feedback scheme, the first UE 14_1 to the K-th UE 14_*k* may generate a PMI indicating one precoding matrix that is the best in the precoding matrix set and PMIs indicating two precoding matrices that are the worst therein.

In addition, each of the first UE 14_1 to the K-th UE 14_*k* may generate a Channel Quality Indicator (CQI) corresponding to at least one generated PMI. For example, the first UE 14_1 to the K-th UE 14_*k* may generate a CQI indicating an appropriate channel coding rate and modulation scheme (or Modulation and Coding Scheme (MCS)) level when performing communication based on the best precoding matrix. The base station 12 may calculate a data throughput of the corresponding feedback scheme based on the CQIs received from the first UE 14_1 to the K-th UE 14_*k*, and the calculated data throughput may be used to generate history information.

In an embodiment, each of the first UE 14_1 to the K-th UE 14_*k* may transmit feedback including a CQI and at least one PMI coinciding with the selected feedback scheme to the base station 12. The corresponding feedback may be referred to as 'channel state information.'

In an embodiment, the base station 12 may group the first UE 14_1 to the K-th UE 14_*k* into a companion group CG based on feedback received from the first UE 14_1 to the K-th UE 14_*k*. For example, the base station 12 may group the first UE 14_1 to a third UE 14_3 into the companion group CG based on feedback. Conditions for the first UE 14_1 to a third UE 14_3 grouped into the companion group CG will be described in detail later with reference to FIG. 8.

In an embodiment, the base station 12 may perform Multiple User-MIMO (MU-MIMO) communication with the first UE 14_1 to the third UE 14_3 of the companion group CG. Specifically, the base station 12 may perform MU-MIMO communication with the first UE 14_1 to the third UE 14_3 by using resources of the same time-frequency domain. The base station 12 may perform Single User-MIMO (SU-MIMO) communication for the remaining UEs (such as a fourth UE 14_4 to the k-th UE 14_*k*) by using resources of different time-frequency domains.

Although the number of UEs in the companion group CG is three in FIG. 1, the base station 12 may change the number of UEs in the companion group CG by selecting another feedback scheme. In addition, the plurality of feedback schemes may include the feedback schemes for SU-MIMO communication with the first UE 14_1 to the K-th UE 14_*k*. When a feedback scheme for SU-MIMO communication is selected, the base station 12 may perform SU-MIMO communication with the first UE 14_1 to the K-th UE 14_*k* using resources of different time-frequency domains without grouping the first UE 14_1 to the K-th UE 14_*k* into the companion group CG.

Bits of feedback received by the base station 12 from the first UE 14_1 to the K-th UE 14_*k* may be referred to as 'feedback overhead Q bits'. That is, the magnitude of the bits of the feedback may be determined based on the Q value. The base station 12 and the first UE 14_1 to the K-th UE 14_*k* may promise, each other, the feedback overhead Q bits through predetermined signaling. In an embodiment, the number and type of a plurality of feedback schemes of the base station 12 may vary depending on the Q value of the feedback overhead Q bits, and the detailed description thereof will be given later with reference to FIG. 14.

According to an embodiment, the base station 12 may maximize the resource use efficiency of the time-frequency domain of MU-MIMO by adjusting, into a large number, the number of UEs in the companion group CG according to a situation. In addition, by adjusting the codebook size to be small, the probability of grouping to the companion group CG (which may be lowered) may be improved, as the number of UEs in the companion group CG increases. Thus, high communication performance may be ensured.

According to an embodiment, the first UE 14_1 to the K-th UE 14_*k* may support MU-MIMO communication with the base station 12 with high time-frequency domain resource utilization efficiency and high communication performance by generating feedback coinciding with the selected feedback scheme from the base station 12 and providing the generated feedback to the base station 12.

Figure 2A:
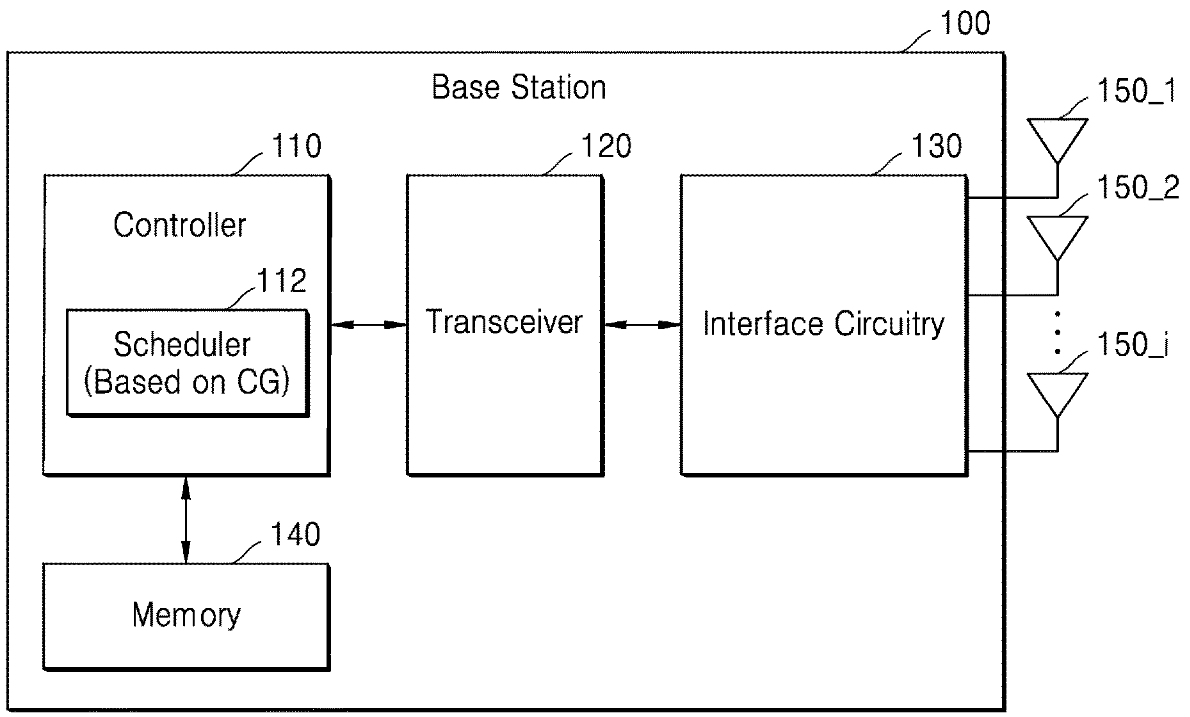
FIG. 2A is a block diagram illustrating a base station according to an embodiment.
Figure 2B:
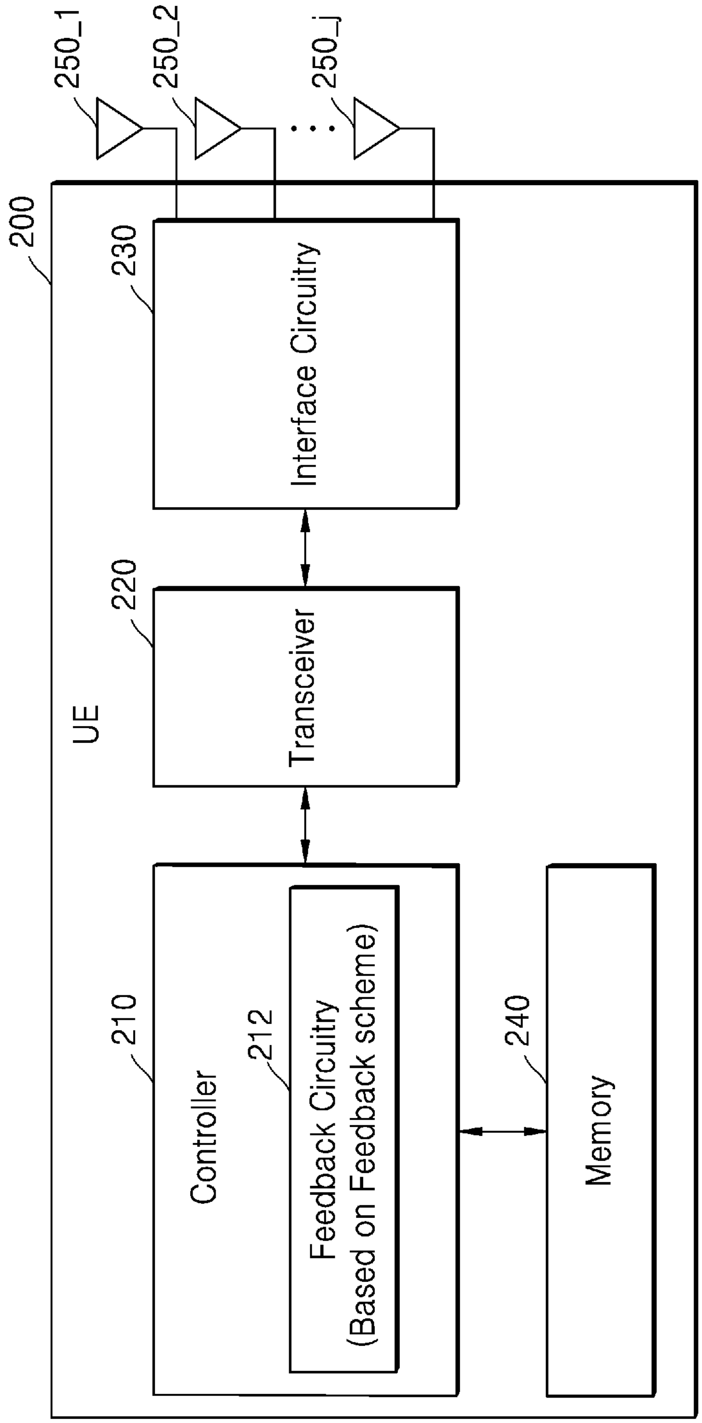
FIG. 2B is a block diagram illustrating a UE according to an embodiment.

FIG. 2A is a block diagram illustrating a base station 100 according to an embodiment, and FIG. 2B is a block diagram illustrating a UE 200 according to an embodiment. Implementations of the base station 100 and the UE 200 in FIGS. 2A and 2B may be applied to the base station 12 and the first UE 14_1 to the K-th UE 14_*k* in FIG. 1, respectively.

In FIG. 2A, the base station 100 may include a controller 110, a transceiver 120, interface circuitry 30, a memory 140, and a plurality of antennas 150_1 to 150_*i*. The interface circuitry 130 may include a plurality of switches connecting the plurality of antennas 150_1 to 150_*i* with the transceiver 120, according to an operation of the transceiver 120, a plurality of low noise amplifiers for amplifying received signals, and a plurality of power amplifiers for amplifying signals to be transmitted.

The transceiver 120 may receive Radio Frequency (RF) signals transmitted from the UEs through the plurality of antennas 150_1 to 150_i. The transceiver 120 may generate Intermediate Frequency (IF) signals or baseband signals by down-converting the received RF signals into a low-frequency. The transceiver 120 may generate data by filtering, decoding, and/or digitizing intermediate frequency signals or baseband signals.

In addition, the transceiver 120 may receive data from the controller 110. The transceiver 120 may encode, multiplex, and/or analog-convert the received data to generate intermediate frequency signals or baseband signals. The transceiver 120 may up-convert intermediate frequency signals or baseband signals into a higher frequency and transmit the result to the UEs through the plurality of antennas 150_1 to 150_i as RF signals.

The controller 110 may perform an overall control operation on the base station 100 for MIMO communication with the UEs, and may include a scheduler 112 for scheduling resources of a time-frequency domain in MIMO communication.

In an embodiment, the scheduler 112 may perform a scheduling operation such that the base station 100 may perform MU-MIMO communication based on the UEs and the companion group CG. The scheduler 112 may control the base station 100 to perform MU-MIMO communication with the UEs grouped into the companion group CG by adjusting the number of UEs of the companion group CG and the codebook size. Specifically, the scheduler 112 may identify the number of currently activated UEs and select a feedback scheme expected to support the highest data throughput among the plurality of feedback schemes based on the identified number of UEs.

For example, the scheduler 112 may refer to the history information to select a feedback scheme, and the history information may include at least one of pass/fail information on the plurality of feedback schemes and information on an accumulated average data throughput of the passed feedback schemes by the number of activated UEs.

In an embodiment, the plurality of feedback schemes may be predefined according to the feedback overhead Q bit. That is, the number and type of the plurality of feedback schemes may be different according to the feedback overhead Q bit.

The scheduler 112 may determine the number of UEs of the companion group CG and the codebook size based on the selected feedback scheme, and may perform scheduling to perform MIMO communication with activated UEs based on the determined number and codebook size. A feedback scheme for SU-MIMO communication with UEs may be included in the plurality of feedback schemes, and the scheduler 112 may perform scheduling for performing SU-MIMO communication with activated UEs when the corresponding feedback scheme is selected.

The controller 110 may execute a program and/or process stored in the memory 140 to perform an overall control operation for the base station 100. In some configurations, the scheduler 112 may be stored in the memory 140 in the form of program code executed by the controller 110 to perform the operation according to the embodiments described above. The controller 110 may perform an operation of the scheduler 112 by accessing the memory 140 and executing the stored program code. In addition, the above-described history information may be stored in the memory 140.

In FIG. 2B, the UE 200 may include a controller 210, a transceiver 220, interface circuitry 230, a memory 240, and a plurality of antennas 250_1 to 250_j. The interface circuitry 230 may include a plurality of switches connecting the plurality of antennas 250_1 to 250_i with the transceiver 220, according to an operation of the transceiver 220, a plurality of low noise amplifiers for amplifying received signals, and a plurality of power amplifiers for amplifying signals to be transmitted.

The transceiver 220 may receive RF signals transmitted from the base station through the plurality of antennas 250_1 to 250_j. The transceiver 220 may generate Intermediate Frequency (IF) signals or baseband signals by converting the received RF signals into down-frequency. The transceiver 220 may generate data by filtering, decoding, and/or digitizing intermediate frequency signals or baseband signals.

In addition, the transceiver 220 may receive data from the controller 210. The transceiver 220 may encode, multiplex, and/or analog-convert the received data to generate intermediate frequency signals or baseband signals. The transceiver 220 may convert intermediate frequency signals or baseband signals into up-frequency and transmit the result to the base station through the plurality of antennas 250_1 to 250_i as RF signals.

The controller 210 may perform an overall control operation on the UE 200 for MIMO communication with the base station, and may include feedback circuitry 212 that generates feedback on a downlink channel status with the base station for MIMO communication.

In an embodiment, the feedback circuitry 212 may generate feedback to be provided to the base station 100 based on the feedback scheme selected from the base station 100. The feedback circuitry 212 may receive information on the selected feedback scheme from the base station 100 and may recognize the selected feedback scheme, and may generate at least one PMI belonging to a precoding matrix set according to a codebook size coinciding with the selected feedback scheme, and corresponding to a number coinciding with the selected feedback scheme. Based on the selected feedback scheme, the feedback circuitry 212 may generate PMIs using a set of precoding matrices containing fewer precoding matrices as the number of UEs in the companion group increases. For example, when the number of UEs in the companion group of the selected feedback scheme is three and the codebook size is four, the feedback circuitry 212 may generate PMIs indicating three precoding matrices in a set of precoding matrices consisting of four precoding matrices. Specifically, the feedback circuitry 212 may estimate a downlink channel state with the current base station using the precoding matrix set, to thereby generate one PMI indicating the best precoding matrix and two PMIs indicating the two worst precoding matrixes in the estimated channel state.

In addition, in an embodiment, the feedback circuitry 212 may generate a CQI coinciding with the PMI indicating the best precoding matrix in the at least one generated PMI. The feedback circuitry 212 may control the transceiver 220 and the interface circuitry 230 to transmit feedback including at least one generated PMI and the generated CQI to the base station. In some configurations, the feedback may further include a Rank Indicator (RI).

The controller 210 may execute a program and/or process stored in the memory 240 to perform an overall control operation on the UE 200. In some configurations, the feedback circuitry 212 may be stored in the memory 240 in the form of program code executed by the controller 210 to perform an operation according to the embodiments described above. The controller 210 may perform an operation of the feedback circuitry 212 by accessing the memory 240 and executing the stored program code.

Figure 3:
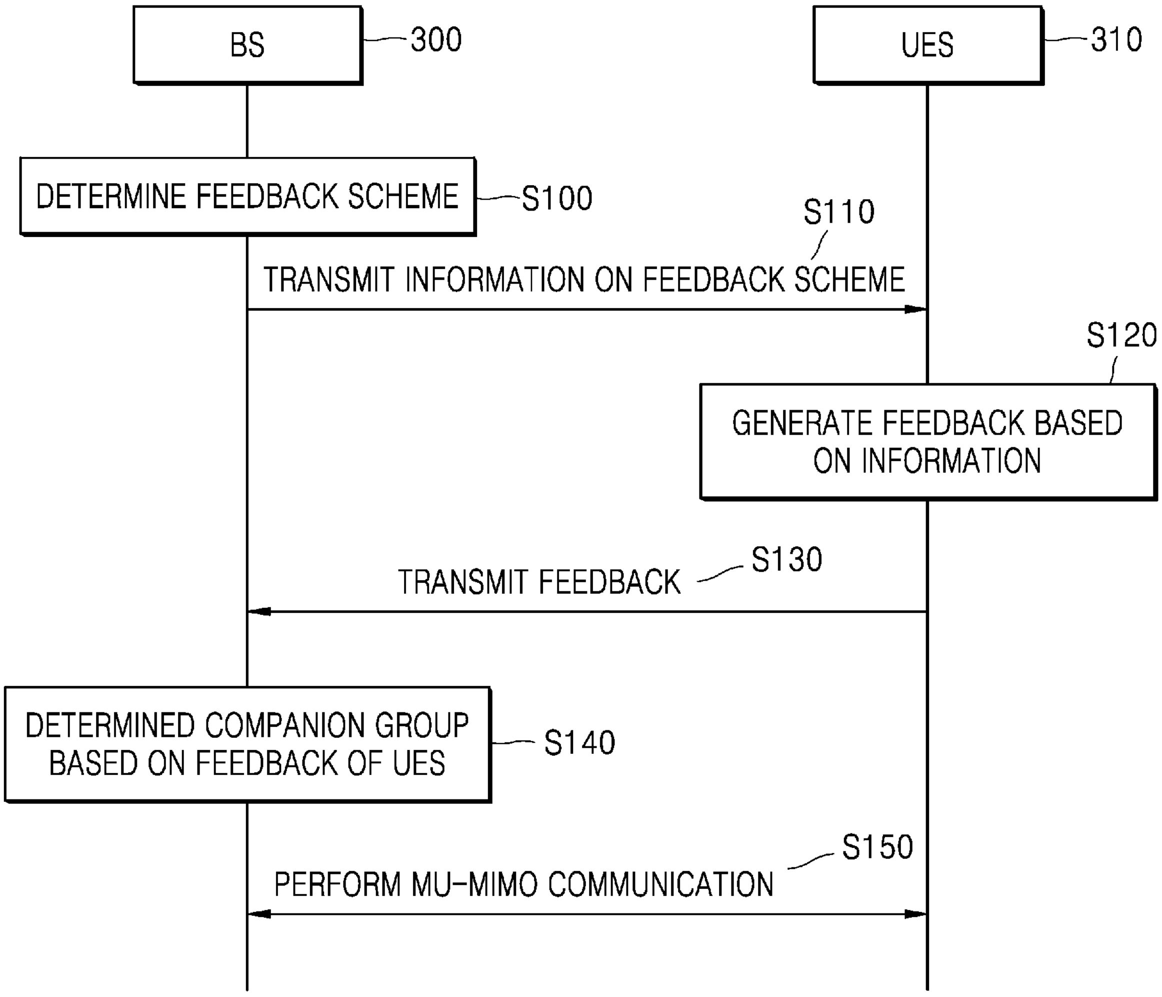
FIG. 3 is a flowchart illustrating a method between a base station and activated UEs according to an embodiment.

FIG. 3 is a flowchart illustrating a method between a base station 300 and activated UEs 310 according to an embodiment.

In FIG. 3, in operation S100, the base station 300 may determine a feedback scheme. In an embodiment, the base station 300 may identify the number of activated UEs 310 and select a feedback scheme expected to support the highest data throughput among a plurality of feedback schemes by referring to history information based on the identified number. However, since this is only an example, any one of a plurality of feedback schemes may be selected based on elements other than the number of activated UEs 310. In an embodiment, the plurality of feedback schemes may be defined as the number of UEs in the companion group and the codebook size. In some embodiments, the plurality of feedback schemes may be defined based on a Q value of a feedback overhead Q bit of the activated UEs 310.

In operation 5110, the base station 300 may transmit information on the feedback scheme to the activated UEs 310. In an embodiment, the base station 300 may transmit, to the activated UEs 310, information on the feedback scheme indicating the feedback scheme selected by the base station 300 through a Physical Broadcast Channel (PBCH).

In operation S120, the activated UEs 310 may generate feedback based on information on the feedback scheme. In an embodiment, each of the activated UEs 310 may coincide with (or utilize) the selected feedback scheme and generate feedback indicating a downlink channel state between the UE and the base station 300.

In operation S130, each of the activated UEs 310 may transmit feedback to the base station 300.

In operation S140, the base station 300 may determine a companion group based on feedback of the activated UEs 310. In an embodiment, the base station 300 may group the activated UEs 310 into the companion group based on the number of UEs in the companion group corresponding to the selected feedback scheme. For example, the base station 300 may group, into the companion group, some UEs satisfying a predetermined condition among the activated UEs 310.

In operation S150, the base station 300 may perform MU-MIMO communication with UEs grouped into the companion group. In addition or alternatively, the base station 300 may perform SU-MIMO communication with UEs that are not grouped into the companion group.

Figure 4A:
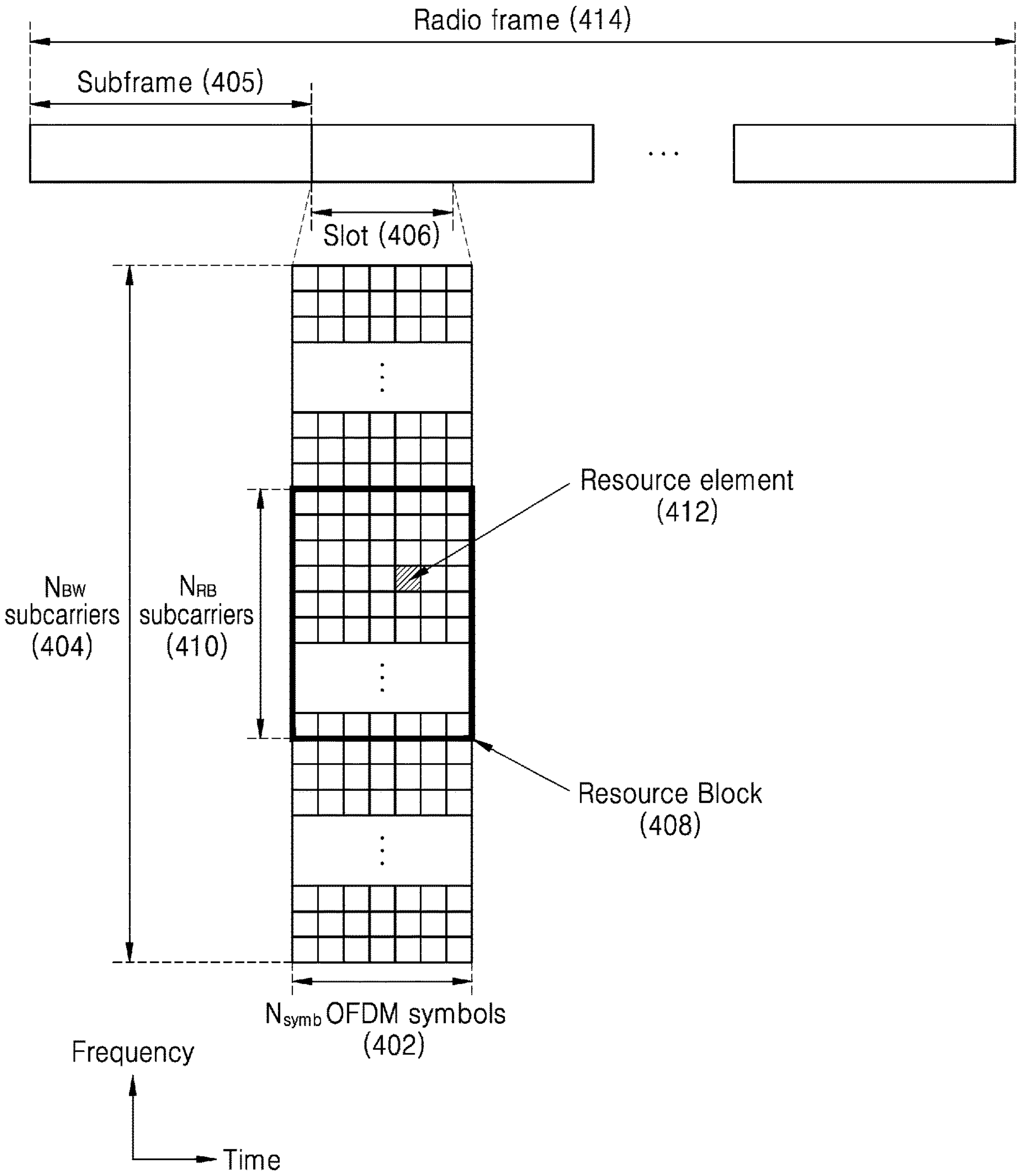
FIG. 4A is a diagram illustrating a basic structure of a time-frequency domain that is a radio resource region in a wireless communication system.
Figure 4B:
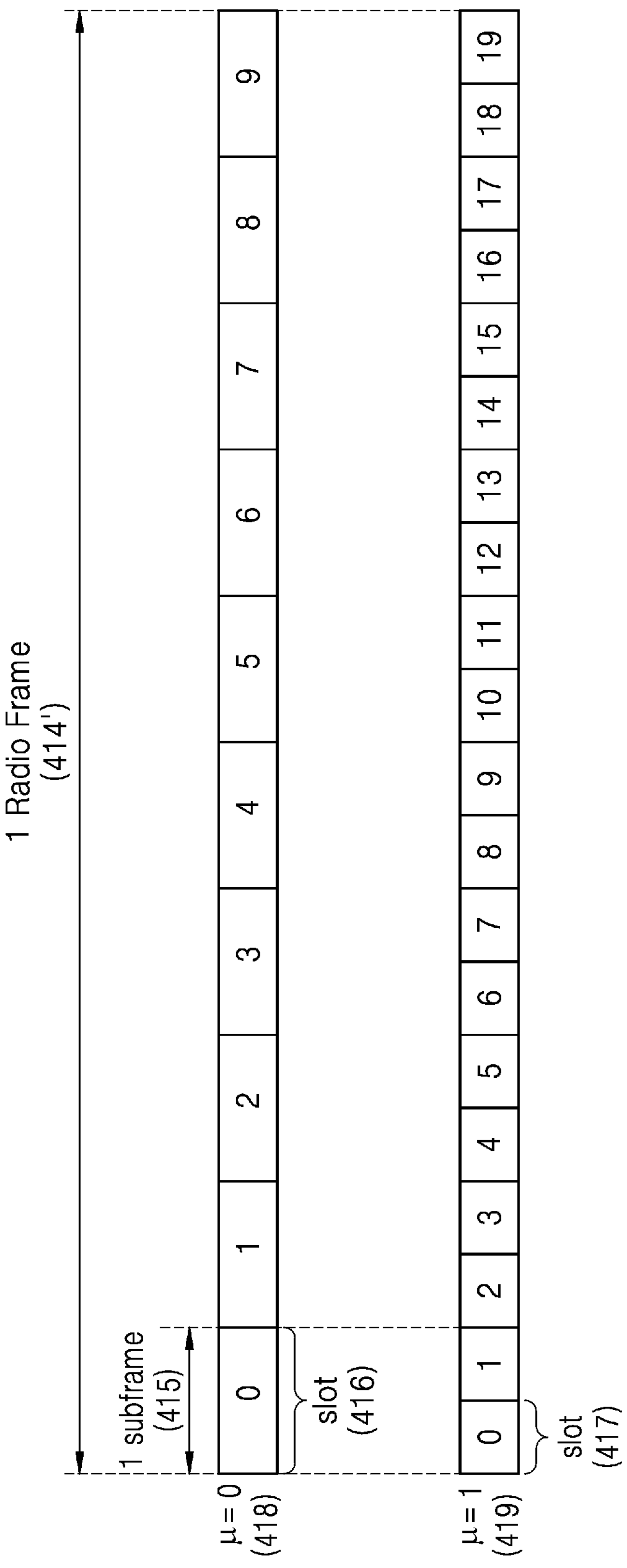
FIG. 4B is a diagram illustrating a slot structure in a wireless communication system.
Figure 4C:
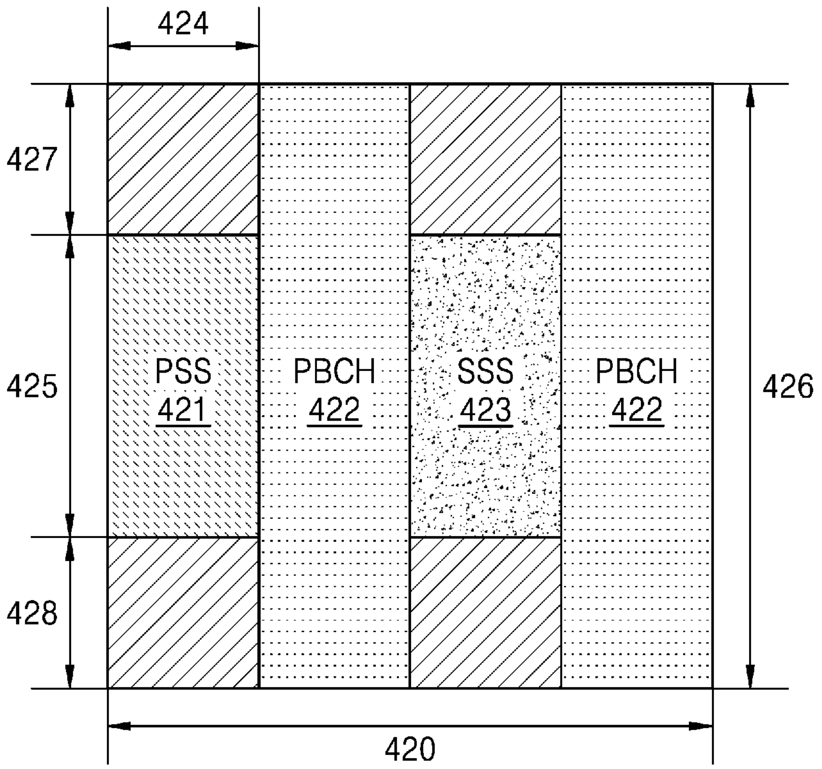
FIG. 4C is a diagram illustrating an example of a synchronization signal block (SSB) in a wireless communication system.
Figure 4D:
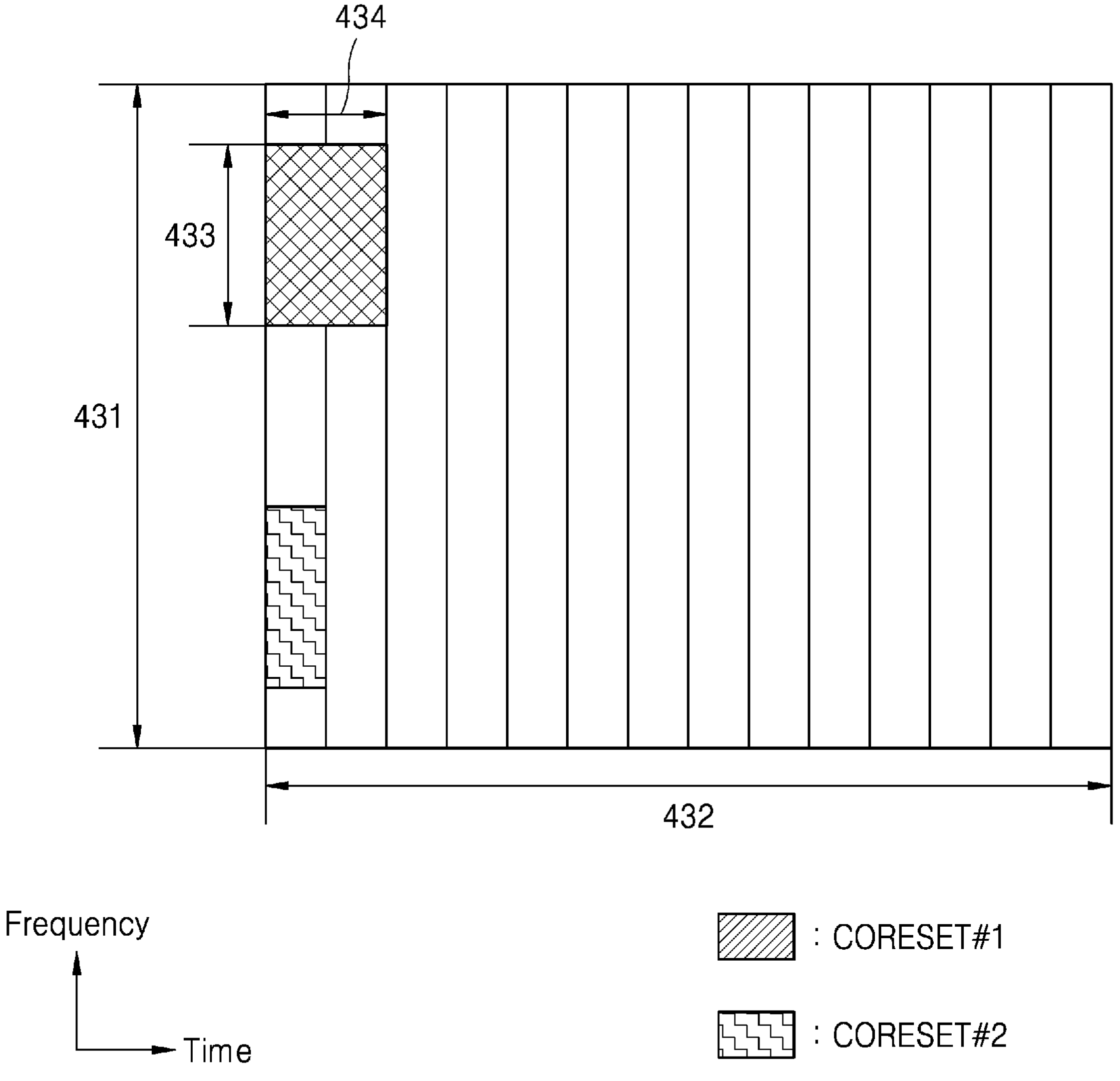
FIG. 4D is a diagram illustrating an example of a core set in a wireless communication system.

FIG. 4A is a diagram illustrating a basic structure of a time-frequency domain that is a radio resource region in a wireless communication system. FIG. 4B is a diagram illustrating a slot structure in a wireless communication system. FIG. 4C is a diagram illustrating an example of a Synchronization Signal Block (SSB) in a wireless communication system. FIG. 4D is a diagram illustrating an example of a core set in a wireless communication system.

In FIG. 4A, the horizontal axis may represent a time domain, and the vertical axis may represent a frequency domain. The minimum transmission unit in the time domain is an Orthogonal Frequency Division Multiplexing (OFDM) symbol, in which $N_{symb}$ OFDM symbols 402 may be gathered to form one slot 406. Two slots may be gathered to form one subframe 405. For example, the length of the slot 406 may be 0.5 ms, and the length of the subframe 405 may be 1.0 ms. However, this is only an example, and the length of the slot 406 may vary depending on the configuration of the slot 406, and the number of slots 406 included in the subframe 405 may vary depending on the length of the slot 406. In the NR network, a time-frequency domain may be defined around the slot 406. In addition, the radio frame 414 may be a unit of a time domain consisting of ten subframes 405.

The minimum transmission unit in the frequency domain is a subcarrier, and the bandwidth of the entire system transmission band may be composed of a total of $N_{BW}$ subcarriers 404. The basic unit of a resource in the time-frequency domain is a Resource Element (RE) 412, which may be represented by an OFDM symbol index and a subcarrier index. A resource block 408 may be defined by $N_{symb}$ consecutive OFDM symbols 402 in the time domain and $N_{RB}$ consecutive subcarriers 410 in the frequency domain. Accordingly, one RB 408 may be composed of ($N_{symb}$*$N_{RB}$) REs 412. An RB pair may include ($N_{symb}$*2 $N_{RB}$) REs 412 in contiguous units of two RBs on a time axis.

The base station may perform MIMO communication with the plurality of UEs through resources of the time-frequency domain as shown in FIG. 4A. For example, the base station may perform MU-MIMO communication with UEs grouped into the companion group through the same resource in the time-frequency domain of FIG. 4A. In addition, the base station may perform SU-MIMO communication with UEs not grouped into the companion group through different resources in the time-frequency domain of FIG. 4A.

In an embodiment, the base station may adjust the codebook size with the number of UEs in the companion group based on the number of UEs activated within its coverage to perform MU-MIMO communication for the companion group. Specifically, when the number of UEs in the companion group is adjusted to be large, the base station may adjust the codebook size to be small. Such an operation may be performed through an operation in which the base station selects any one of the plurality of feedback schemes.

In FIG. 4B, one radio frame 410 may be defined as 10 ms, a subframe 411 may be defined as 1 ms, and the radio frame 410 may include a total of ten subframes 411. One slot 412 or 413 may be defined as fourteen OFDM symbols (i.e., the number of symbols per slot)

$$(N_{symb}^{slot}=14).$$

One subframe 411 may consist of one or a plurality of slots 412 or 413, and the number of slots 412 or 413 per subframe 411 may vary depending on a set value μ 414 or 415 for subcarrier spacing and the number of symbols included in slots 412 or 413. In FIG. 4B, the case of μ=0 414 and the case of μ=1 415 are illustrated as the subcarrier spacing setting values. When the subcarrier spacing setting value is μ=0 414, one subframe 411 may include one slot 412, and when the subcarrier spacing setting value is μ=1 415, one subframe 411 may include two slots 413.

As described above, the number of slots per subframe may vary according to the setting value μ for subcarrier spacing, and accordingly, the number of slots per frame may vary. The number of slots per subframe $$(N_{slot}^{subframe,\mu})$$

and the number of slots per frame $$(N_{slot}^{frame,\mu})$$

according to the setting value μ for each subcarrier spacing may be defined as Table 1.

TABLE 1

| μ | $N_{slot}^{symb}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

In addition, in some embodiments, the number of slots per subframe may vary according to the number of symbols included in one slot. For example, the setting value μ may be any one of 0, 1, 2, 3, and 4, and each of the values may mean 15 kHz, 30 kHz, 60 kHz, 120 kHz, or 240 kHz.

In an embodiment, the number and type of the plurality of feedback schemes may vary according to the setting value μ for subcarrier spacing. The base station may perform MU-MIMO communication with the UEs by selecting any one of the plurality of feedback schemes coinciding with the setting value μ for subcarrier spacing.

In FIG. 4C, an SSB 420 may include a Primary Synchronization Signal (PSS) 421, a PBCH 422, and a Secondary Synchronization Signal (SSS) 423.

The PSS 421 and the SSS 423 may be transmitted as 12 RBs 425 on a frequency axis and one OFDM symbol 424 on a time axis. In the NR network, a total of 1008 different cell IDs may be defined, and the PSS 421 may have three different values and the SSS 423 may have 336 different values depending on the physical layer ID of the cell.

The PBCH 422 may be transmitted as 24 RBs 426 on the frequency axis and two OFDM symbols spaced apart from each other on the time axis. A Master Information Block (MIB) including various system information may be transmitted to the UE through the PBCH 422. In an embodiment, at least one of information on the feedback scheme selected from the base station and information on the feedback overhead Q bit may be transmitted to the UE through the PBCH 422.

The SSB 420 is mapped to a total of four OFDM symbols, and since the transmission bandwidths (12 RBs 425) of the PSS 421 and the SSS 423 are different from the transmission bandwidths (24 RBs 426) of the PBCH 422, other regions 427 and 428 than 12 RBs 425 in the middle of the symbol in which the PSS 421 and the SSS 423 are transmitted may be used to transmit different types of signals or may be empty.

The UEs may obtain a System Information Block (SIB) by decoding a Physical Downlink Control Channel (PDCCH) and a Physical Downlink Shared Channel (PDSCH) based on system information included in the received MIB. The UEs may form a wireless link with the serving cell through a random access process based on the network synchronization information and system information obtained during a cell search process. In addition, in an embodiment, the UEs may adaptively generate and provide feedback to the base station, the feedback corresponding to at least one of the information regarding the feedback scheme received via the PBCH 422 and the information regarding the feedback overhead Q bit.

In FIG. 4D, the bandwidth 431 may be entirely set on the frequency axis and two core sets CORESET #1 and CORESET #2 may be set in one slot 432 on the time axis. The core sets CORESET #1 and CORESET #2 may be set to a specific frequency resource 433 in the bandwidth 431 on the frequency axis. The core sets CORESET #1 and CORESET #2 may be set to one or a plurality of OFDM symbols on the time axis, which may be defined as a duration 434 of the core sets CORESET #1 and CORESET #2. For example, the first core set CORESET #1 may be set to the duration of two symbols, and the second core set CORESET #2 may be set to the duration of one symbol.

In an embodiment, the base station may transmit at least one of the selected feedback scheme and information on the feedback overhead Q bit to the UEs using any one of the core sets CORESET #1 and CORESET #2. In some embodiments, the base station may transmit at least one of the selected feedback scheme and information on the feedback overhead Q bit to the UEs through Radio Resource Control (RRC) signaling or Medium Access Control-Control Element (MAC-CE) signaling.

Figure 5:
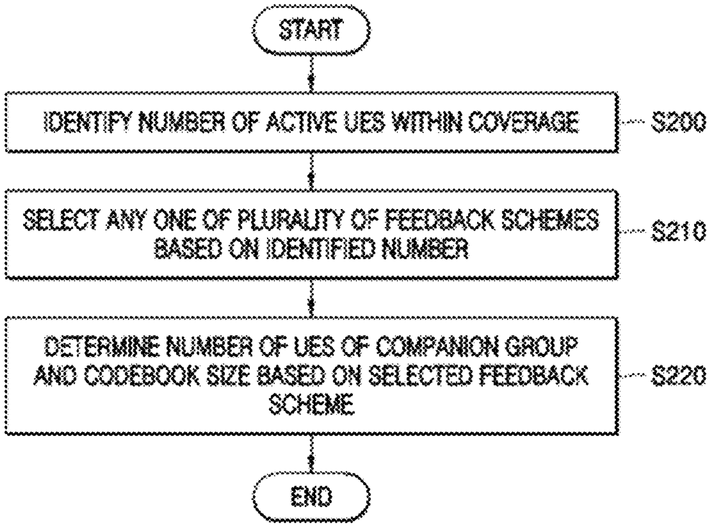
FIG. 5 is a flowchart illustrating a method of a base station according to an embodiment.

FIG. 5 is a flowchart illustrating a method of a base station according to an embodiment. The embodiment illustrated in FIG. 5 may correspond to operation S100 of FIG. 3. In FIG. 5, in operation S200, the base station may identify the number of activated UEs within the coverage.

In operation S210, the base station may select any one of a plurality of feedback schemes based on the identified number.

In operation S220, the base station may determine the number of UEs in the companion group and the codebook size based on the selected feedback scheme.

Figure 6:
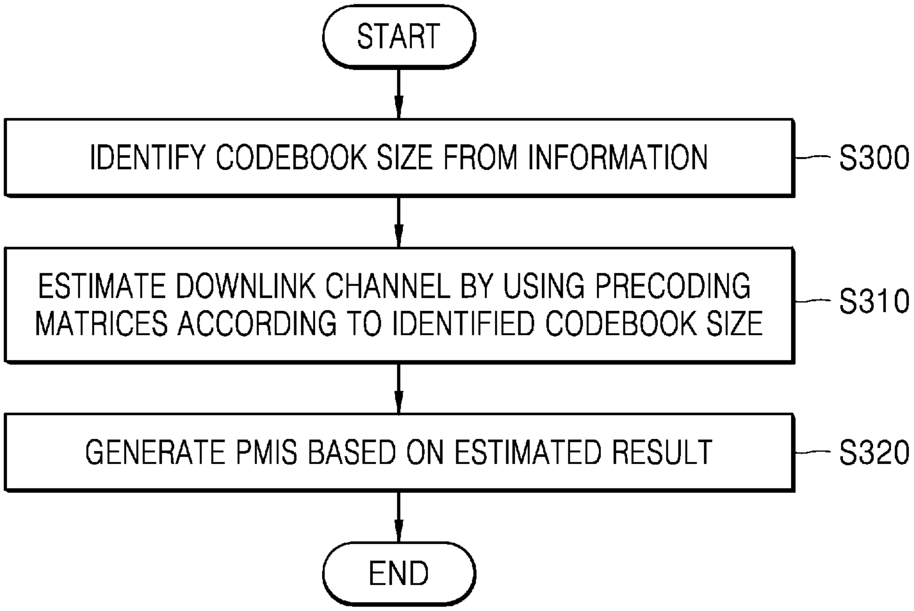
FIG. 6 is a flowchart illustrating a method of a UE according to an embodiment.

FIG. 6 is a flowchart illustrating a method of a UE according to an embodiment. The embodiment illustrated in FIG. 6 may correspond to operation S120 of FIG. 3.

In FIG. 6, in operation S300, the UE may identify a codebook size from information on a feedback scheme selected from the base station.

In operation S310, the UE may estimate a downlink channel using the precoding matrices based on the identified codebook size. For example, the UE may estimate a downlink channel for each precoding matrix by applying precoding matrices according to the codebook size to a Demodulation Reference Signal (DMRS) received from the base station.

In operation S320, the UE may generate PMIs including a PMI (or at least one PMI) indicating a best precoding matrix and at least one PMI indicating a worst precoding matrix based on the estimation result. The number of PMIs generated by the UE may correspond to the feedback scheme selected from the base station. In some configurations, the UE may generate only the PMI indicating the best precoding matrix based on the selected feedback scheme, in which case the UE may perform SU-MIMO communication with the base station.

Figure 7A:
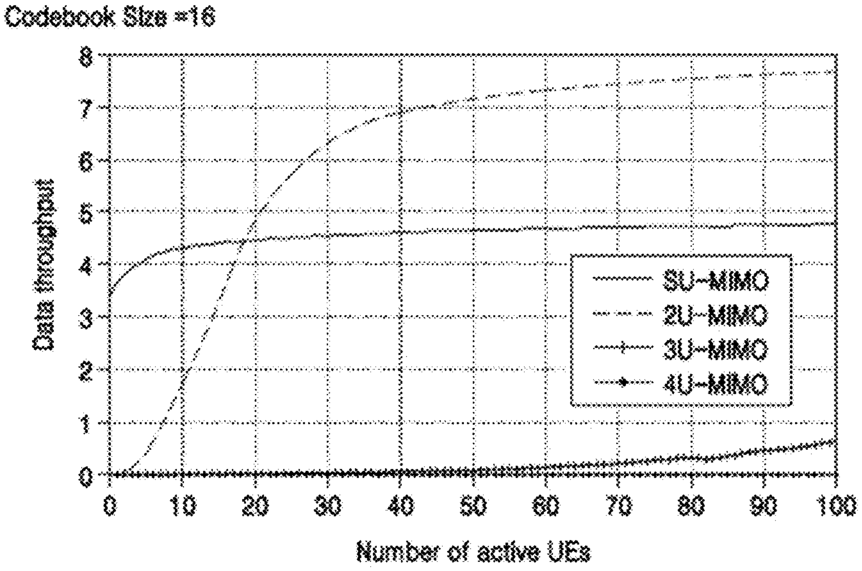
FIGS. 7A to 7C are graphs illustrating a correlation between a codebook size, the number of activated UEs, and a data throughput.
Figure 7B:
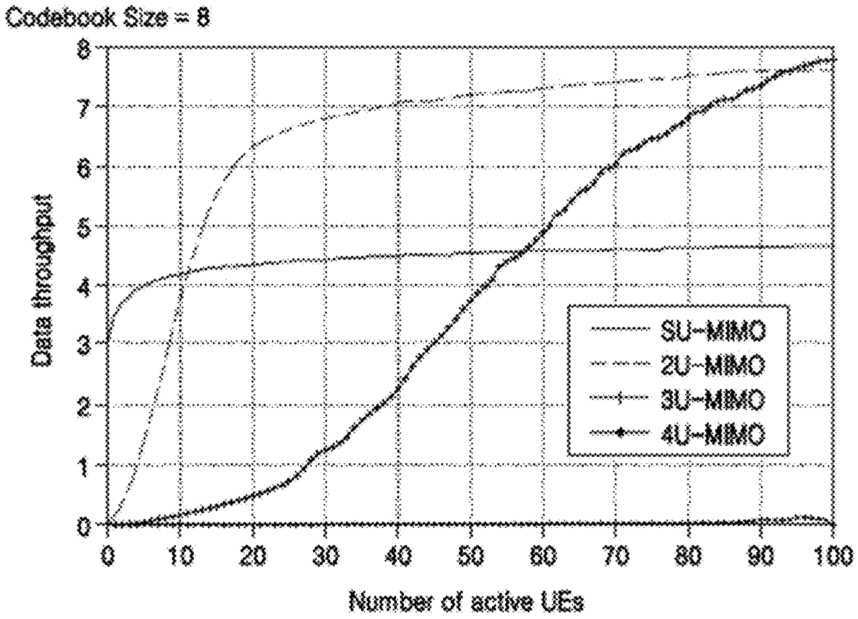
Figure 7C:
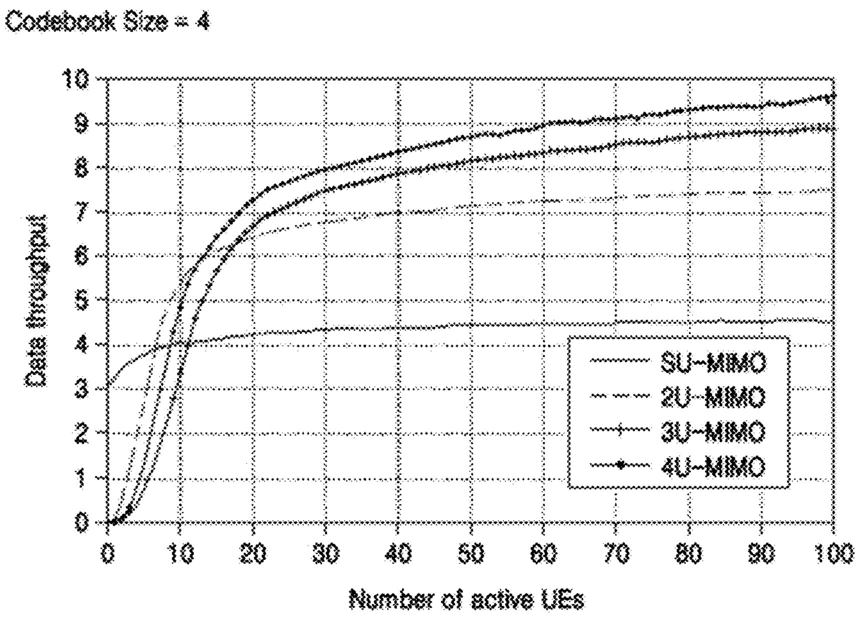

FIGS. 7A to 7C are graphs illustrating a correlation between a codebook size, the number of activated UEs, and a data throughput. In FIGS. 7A to 7C, two users-MIMO (2U-MIMO), three users-MIMO (3U-MIMO), and four users-MIMO (4U-MIMO) correspond to a MU-MIMO. The number of UEs in the companion group is two in the 2U-MIMO, the number of UEs in the companion group is three in the 3U-MIMO, and the number of UEs in the companion group is four in the 4U-MIMO.

In FIG. 7A, when the codebook size is 16, as the number of activated UEs increases, the data throughput supported by the 3U-MIMO and the 4U-MIMO is very low, and single user-MIMO (SU-MIMO) may support gently high data throughput as the activated UEs increase. The 2U-MIMO may continuously increase as the activated UEs increase and support higher data throughput than the SU-MIMO from a first particular number. As such, when the number of UEs in the companion group is three or more, the probability that the UEs are grouped into the companion group is low, and thus, the data throughput supported in the 3U-MIMO and the 4U-MIMO may be very low when the codebook size is 16. As shown in FIG. 7A, when the codebook size is 16, it may be difficult for the base station to perform 3U-MIMO communication or 4U-MIMO communication due to very low data throughput.

In FIG. 7B, when the codebook size is 8, as the number of activated UEs increases, the data throughput supported by the 4U-MIMO is very low, and SU-MIMO may support gently high data throughput as the activated UEs increase. The 2U-MIMO may continuously increase as the activated UEs increase and support higher data throughput than the SU-MIMO from a second particular number. In addition, the 3U-MIMO may continuously increase as the activated UEs increase and support higher data throughput than the SU-MIMO from a third particular number and higher data throughput than the 2U-MIMO from a fourth particular number.

In FIG. 7C, when the codebook size is 4, the SU-MIMO may support gradually high data throughput as the activated UEs increase. The 2U-MIMO may continuously increase as the activated UEs increase and support higher data throughput than the SU-MIMO from a sixth particular number. The 3U-MIMO may continuously increase as the activated UEs increase and support higher data throughput than the SU-MIMO from a seventh particular number and higher data throughput than the 2U-MIMO from an eighth particular number. In addition, the 4U-MIMO may continuously increase as the activated UEs increase and support higher data throughput than the 3U-MIMO from a ninth particular number, higher data throughput than the SU-MIMO from a tenth particular number, and higher data throughput than the 2U-MIMO from an eleventh particular number.

According to an embodiment, as the number of (activated) UEs in the companion group increases, the codebook size is adjusted to be (complementarily) small, thereby effectively performing MU-MIMO (e.g., 3U-MIMO, 4U-MIMO) communication based on the companion group including three or more UEs.

Figure 8:
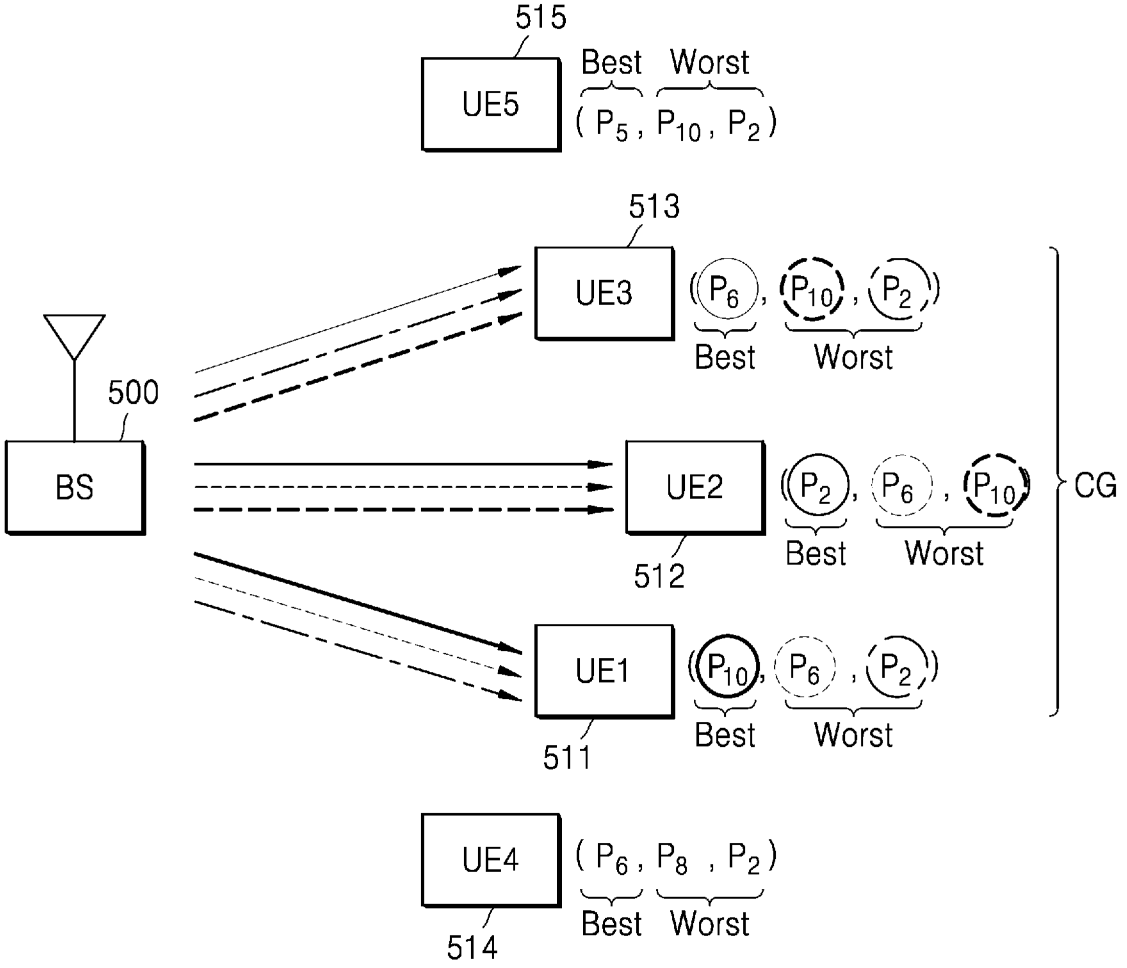
FIG. 8 is a diagram illustrating an operation between a base station and first to fifth UEs according to an embodiment.

FIG. 8 is a diagram illustrating an operation between a base station 500 and a UE1 511 to a UE5 515 according to an embodiment. In FIG. 8, a feedback scheme having three UEs (UE1, UE2, and UE3) of a companion group CG is selected based on the number of the UE1 511 to the UE5 515 in which the base station 500 is activated. Although FIG. 8 is only an example, the embodiments are not limited thereto, and the base station 500 may communicate with more UEs, and there may be more companion groups.

In FIG. 8, each of the UE1 511 to the UE5 515 may generate three PMIs based on a feedback scheme selected from the base station 500 and transmit the generated three PMIs to the base station 500 as feedback. Specifically, the UE1 511 may generate a PMI indicating $P_{10}$ as the best precoding matrix and PMIs indicating $P_2$ and $P_6$ as the worst precoding matrices. The second UE 512 may generate a PMI indicating $P_2$ as the best precoding matrix and PMIs indicating $P_6$ and $P_{10}$ as the worst precoding matrices. The third UE 513 may generate a PMI indicating $P_6$ as the best precoding matrix and PMIs indicating $P_2$ and $P_{10}$ as the worst precoding matrices. The fourth UE 514 may generate a PMI indicating $P_6$ as the best precoding matrix and PMIs indicating $P_2$ and $P_8$ as the worst precoding matrices. The UE5 515 may generate a PMI indicating $P_5$ as the best precoding matrix and PMIs indicating $P_2$ and $P_{10}$ as the worst precoding matrices.

The base station 500 may group the UE1 511 to the UE3 513 into a companion group CG based on feedback received from the UE1 511 to the UE5 515. Specifically, the base station 500 may transmit PMIs indicating $P_2$, $P_6$, and $P_{10}$ precoding matrices, and may group the UE1 511 to the UE3 513 having different best precoding matrices into the companion group CG.

The base station 500 may perform MU-MIMO communication on the UE1 511 to the UE3 513 grouped into the companion group CG. Specifically, the base station 500 may transmit first data encoded into the $P_{10}$ precoding matrix, second data encoded into the $P_2$ precoding matrix, and third data encoded into the $P_6$ precoding matrix to each of the UE1 511 to the UE3 513 through resources in the same time-frequency domain.

The UE1 511 may smoothly receive first data encoded into the best $P_{10}$ precoding matrix, and may minimize interference due to second and third data encoded into the worst $P_6$ and $P_2$ precoding matrices, respectively. The UE2 512 may smoothly receive second data encoded into the best $P_2$ precoding matrix, and may minimize interference due to third and first data encoded into the worst $P_6$ and $P_{10}$ precoding matrices, respectively. In addition, the UE3 513 may smoothly receive third data encoded into the best $P_6$ precoding matrix, and may minimize interference due to first and second data encoded into the worst $P_{10}$ and $P_2$ precoding matrices, respectively.

FIG. 9 is a diagram illustrating a first table TB1 in which a plurality of feedback schemes are organized according to an embodiment. The feedback overhead Q bit in FIG. 9 is bits. However, FIG. 9 is only an example, and thus, the embodiments are not limited thereto, and a plurality of feedback schemes may be variously set.

In FIG. 9, the number of the plurality of feedback schemes may be set to four (4), and the plurality of feedback schemes may be distinguished through a scheme index S. In an embodiment, the feedback scheme may be defined as (N, M, F). Here, N may mean the number of UEs in the companion group or the number of PMIs required from the base station. M may mean the number of CQIs requested from the base station. F may mean a codebook size.

In the first table TB1, the scheme index S with a value of 1 may refer to the feedback scheme of (1, 1, 16), the scheme index S with a value of 2 may refer to the feedback scheme of (2, 1, 8), the scheme index S with a value of 3 may refer to the feedback scheme of (2, 1, 4), and the scheme index S with a value of 4 may refer to the feedback scheme of (3, 1, 4). The feedback scheme of (1, 1, 16) may correspond to SU-MIMO communications performed with all UEs in which the base station is activated.

The base station may select any one of a plurality of feedback schemes based on the number of currently activated UEs and perform MIMO communication with the activated UEs based on the selected feedback scheme.

In this present disclosure, the scheme index S refers to a feedback scheme in which the number of UEs in the companion group decreases as the scheme index decreases, but this is only an example, and the embodiments are not limited thereto. The scheme index S may be variously set so that the base station and the UEs may identify each of the plurality of feedback schemes.

Figure 10:
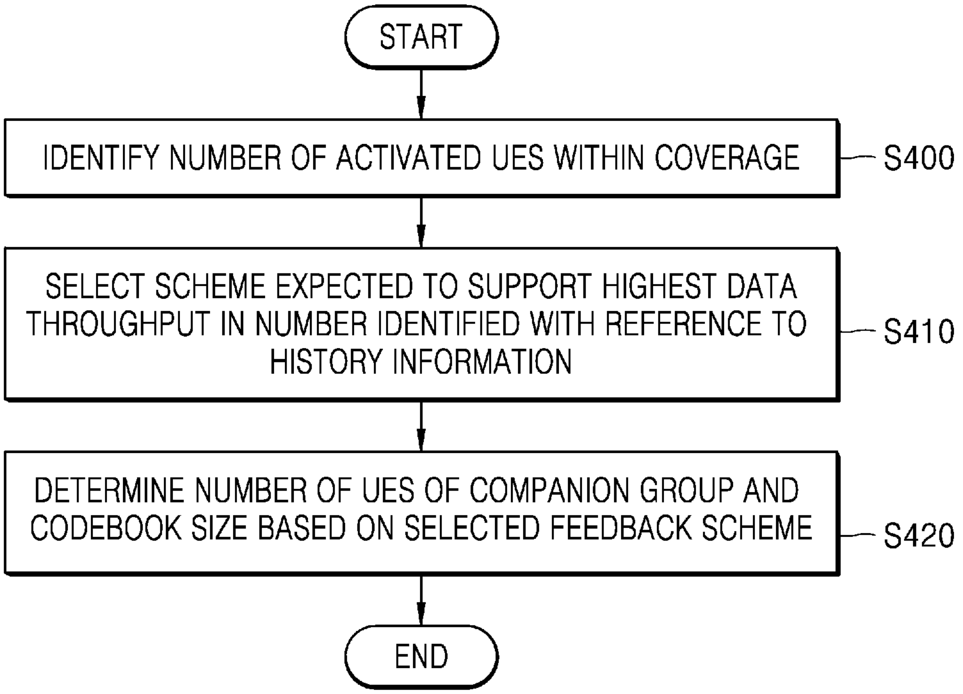
FIG. 10 is a flowchart illustrating a method of a base station according to an embodiment.

FIG. 10 is a flowchart illustrating a method of a base station according to an embodiment. In FIG. 10, in operation S400, the base station may identify the number of activated UEs within a coverage.

In operation S410, the base station may select a feedback scheme that is expected to support the highest data throughput from the identified number with reference to the history information.

In operation S420, the base station may determine the number of UEs in the companion group and the codebook size based on the selected feedback scheme.

FIG. 11 is a diagram illustrating a second table TB2 in which history information is organized according to an embodiment. FIG. 11 is associated with a plurality of feedback schemes of the first table TB1 of FIG. 9. In addition, as an example, the maximum number of activated UEs is shown as 4 in FIG. 11. The embodiments are not limited thereto, and the maximum number of activated UEs in history information may be higher. In addition, in an embodiment, the maximum number of activated UEs of history information may vary depending on the performance of the base station. For example, the maximum number of activated UEs in the history information of the first base station may be different from the maximum number of activated UEs in the history information of the second base station.

In FIG. 11, the history information may include pass/fail information on a plurality of feedback schemes and information on an accumulated average data throughput of the passed feedback schemes.

In the second table TB2 of FIG. 11, the feedback scheme of (1, 1, 16) may be passed when the numbers of activated UEs are 1 to 3, respectively, and may have accumulated average data throughput of THP11, THP21, and THP31 according to the numbers of activated UEs. The feedback scheme of (1, 1, 16) may be failed when the number of activated UEs is 4.

The feedback scheme of (2, 1, 8) may be failed when the numbers of activated UEs are 1 and 2, respectively, may be passed when the numbers of activated UEs are 3 and 4, respectively, and may have accumulated average data throughput of THP32 and THP42 according to the numbers of activated UEs. The feedback scheme of (2, 1, 4) may be failed when the number of activated UEs is 1, and may be passed when the numbers of activated UEs are 3 to 4, respectively.

The feedback scheme of (2, 1, 4) may have accumulated average data throughput of THP23 and THP33 according to the numbers of activated UEs. The feedback scheme of (3, 1, 4) may be failed when the numbers of activated UEs are 1 and 2, respectively, and may be passed when the numbers of activated UEs are 3 and 4, respectively. The feedback scheme of (3, 1, 4) may have accumulated average data throughput of THP34 and THP44 according to the numbers of activated UEs.

For example, the base station may select a feedback scheme that is expected to support the highest data throughput among the feedback schemes of (2, 1, 8), (2, 1, 4) and (3, 1, 4) except for the feedback scheme of the failed (1, 1, 16) when the number of activated UEs is four (4). That is, a feedback scheme having the highest accumulated average data throughput is selected by the base station. The base station may compare the accumulated average data throughputs of THP42, THP43, and THP44, and select a feedback scheme having the highest accumulated average data throughput based on the comparison result.

However, the history information according to the second table TB2 of FIG. 11 is only an example, and is not limited thereto. The plurality of feedback schemes in the history information may reduce the total data amount of the history information by determining the accumulated average data throughput for each range of the number of activated UEs. For example, when the maximum number of activated UEs is 100, the activated UEs of 1 to 20 are set as a first range, the activated UEs of 21 to 40 are set as a second range, the activated UEs of 41 to 60 are set as a third range, the activated UEs of 61 to 80 are set as a fourth range, and the activated UEs of 81 to 100 are set as to a fifth range, to thereby configure history information.

Figure 12:
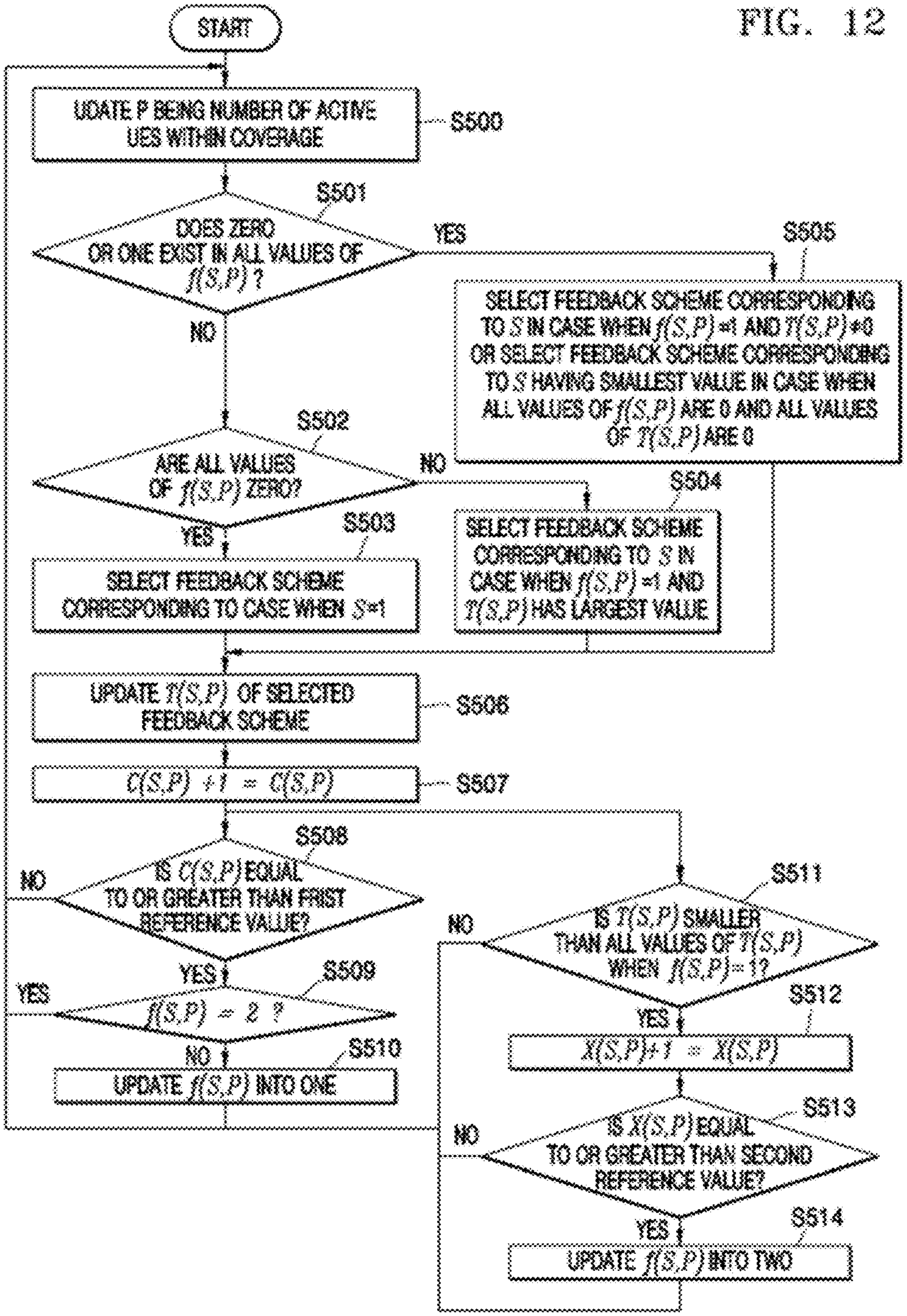
FIG. 12 is a flowchart illustrating a method of generating history information, according to an embodiment.

FIG. 12 is a flowchart illustrating a method of generating history information, according to an embodiment. In FIG. 12, the history information may be generated based on information accumulated in a process in which the base station performs SU-MIMO communication or MU-MIMO communication with the UEs. In an embodiment, a base station may perform SU-MIMO communication or MU-MIMO communication with the UEs until the history information is completed to accumulate the selected feedback scheme and the corresponding data throughput. Hereinafter, a description will be given with reference to FIG. 11.

In FIG. 12, in operation S500, the base station may update P, which is the number of UEs activated in a coverage. In an embodiment, the base station may identify activated UEs among a plurality of UEs in the coverage through predetermined signaling, and may update the number of activated UEs based on the identification result.

In operation S501, the base station may determine whether a value of a f(S, P) is 0 or 1. In an embodiment, S may mean a scheme index of the feedback scheme, and a value of the function f may mean a state of the feedback scheme at the number of activated UEs identified in operation S500. In an example, when the value of the function f is 0, the feedback scheme may be in a try state, when the value of the function f is 1, the feedback scheme may be in a pass state, and when the value of the function f is 2, the feedback scheme may be in a fail state. For example, in FIG. 11, the case when f(1, 1)=0 may indicate that the feedback scheme of (1, 1, 16) is in a try state when the number of activated UEs is 1. The case when f(2, 3)=1 may indicate that the feedback scheme of (2, 1, 8) is in a pass state when the number of activated UEs is 3. In addition, the case when f(3, 1)=2 may indicate that the feedback scheme of (2, 1, 4) is in a fail state when the number of activated UEs is 1.

In the present disclosure, the pass state and the fail state may be defined as determining pass/fail information of FIG. 11. For example, when a specific feedback scheme in a specific number of activated UEs is in a pass state, pass/fail information may be determined as a pass, and when a specific feedback scheme in a specific number of activated UEs is in a fail state, pass/fail information may be determined as a fail.

When "NO" is determined in operation S501, the base station may determine whether all values of the function f(S, P) are 0 in the following operation S502. When "YES" is determined in operation S502, the base station may select a feedback scheme corresponding to when S=1, in the following operation S503, that is, a feedback scheme of (1, 1, 16) of FIG. 11.

That is, when all feedback schemes in all the numbers of activated UEs are in a try state, SU-MIMO communication with activated UEs may be performed by preferentially selecting the feedback scheme of (1, 1, 16). When "NO" is determined in operation S502, the base station may select a feedback scheme corresponding to S when f(S, P)=1 and a function T(S, P) has the largest value in the following operation S504. The value of the function T may mean the accumulated data throughput between the base station and the activated UEs by the selected feedback scheme in the number of activated UEs identified in operation S500.

When "YES" is determined in operation S501, the base station may select a feedback scheme corresponding to S when f(S, P)=0 and T(S, P)≠0, or may select a feedback scheme corresponding to the lowest S when all values of f(S, P) are 0, and all values of T(S, P) are 0. In the feedback scheme (N, M, F) shown in FIG. 11, as the number of UEs in the companion group, that is, N decreases, the scheme index S may also decrease. That is, when all values of the function f(S, P) are 0 and all values of the function T(S, P) are 0 in operation S505, the feedback scheme corresponding to the lowest S may correspond to the feedback scheme in which the number of UEs in the companion group is the smallest from among the feedback schemes which meet a condition in which all values of the function f(S, P) are 0 and all values of the function T(S, P) are 0.

In operation S506, the base station may update T(S, P) of the selected feedback scheme. The base station may calculate and accumulate data throughput between the activated UEs by the feedback scheme currently selected in any one of operations S503, S504, and S505.

In an embodiment, the base station may perform operation S506 by a plurality of times to average the accumulated data throughput and store the average data throughput in the same form as the accumulated average data throughput of FIG. 11. However, this is only an example, and the embodiments are not limited thereto, and history information may be generated by accumulating data throughputs in various ways. An embodiment of the base station calculating a specific data throughput will be described later with reference to FIG. 13.

In operation S507, the base station may count up a function C(S, P). The value of the function C may mean the number of times the data throughput is accumulated, that is, the number of times T(S, P) is updated in operation S506.

In operation S508, the base station may determine whether C(S, P) is equal to or greater than a first reference value. In an embodiment, the first reference value may be set in consideration of the performance of the base station and the like. In some configurations, the first reference value may be adaptively adjusted according to a communication environment between the base station and the activated UEs.

When "YES" is determined in operation S508, the base station may determine whether a value of the function f(S, P) is 2 in the following operation S509. For example, the base station may identify whether the corresponding f(S, P) has previously been determined to be a fail state in advance of operation S510 to prevent a case in which the value of the function f(S, P) is switched from a fail state to a pass state.

When "NO" is determined in operation S509, the base station may update the value of the function f(S, P) from 0 to 1 in the following operation S510. In an exemplary embodiment, the base station may skip future updates of T(S, P) for f(S, P) updated to 1, and generate accumulated average data throughput corresponding to f(S, P) updated to 1, by calculating an average of the accumulated data throughputs. When "NO" is determined in operation S508, or "YES" is determined in operation S509, operation S500 may follow.

In operation S511, the base station may determine whether the value of the T(S, P) updated in operation S506 in parallel with operation S508 is less than all values of the function T(S, P) when f(S, P)=1. When "YES" is determined in operation S511, the base station may count up the value of the function X(S, P) in the following operation S512. The value of the function X may mean the number of times that 'YES" is determined in operation S511.

In operation S513, the base station may determine whether X(S, P) is equal to or greater than a second reference value. In an embodiment, the second reference value may be set in consideration of the performance of the base station and the like. In some configurations, the second reference value may be adaptively adjusted according to a communication environment between the base station and the activated UEs.

When "YES" is determined in operation S513, the base station may update the value of the function f(S, P) from 0 to 2 in the following operation S514. In an embodiment, the base station may skip the update of T(S, P) in the future with respect to f(S, P) updated to 2. When "NO" is determined in operation S511 or S513, operation S500 may follow.

Figure 13:
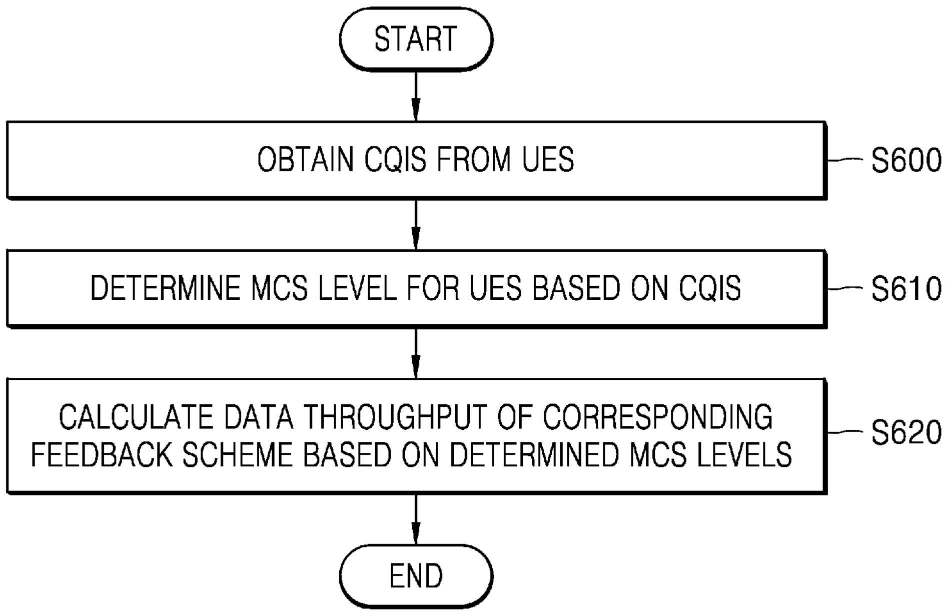
FIG. 13 is a flowchart illustrating a method of calculating data throughput corresponding to a selected feedback scheme of a base station, according to an embodiment.

FIG. 13 is a flowchart illustrating a method of calculating data throughput corresponding to a selected feedback scheme of a base station, according to an embodiment.

In FIG. 13, in operation S600, the base station may obtain CQIs from activated UEs. In an embodiment, each of the activated UEs may allow a CQI to be included in a feedback corresponding to a feedback scheme selected from the base station and provide the CQI-inclusive feedback to the base station.

In operation S610, the base station may determine an MCS level for activated UEs based on CQIs.

In operation S620, the base station may calculate the data throughput of the corresponding feedback scheme based on the determined MCS levels. In an embodiment, the base station may modulate and encode data on the basis of the determined MCS levels and transmit same to the activated UEs, and the base station may calculate the data throughput of the corresponding feedback scheme by additionally considering whether the corresponding data is well received to the activated UEs along with the determined MCS levels.

FIG. 14 is a diagram illustrating a third table TB3 in which history information is organized according to an embodiment. FIG. 14 shows a plurality of feedback schemes, which are differently set according to a feedback overhead Q bit changed by a Dynamic Feedback Selection (DFS). However, this is only an example, and the embodiments are not limited thereto. In addition, the number and type of the plurality of feedback schemes may be variously set according to the feedback overhead Q bit. Further, the feedback overhead Q bit may be more diverse.

In the third table TB3, when Q is 8, feedback schemes of (1, 1, 16) and (2, 1, 8) having feedback indexes of 1 and 2, respectively, may be set. When Q is 10, feedback schemes of (1, 1, 16), (2, 1, 8), and (2, 1, 4) having feedback indexes of 1, 2, and 3, respectively, may be set. When Q is 12, feedback schemes of (1, 1, 16), (2, 1, 16), (2, 1, 8,), (2, 2, 4), (3, 1, 4), and (4, 1, 4) having feedback indexes of 1, 2, 3, 4, 5, and 6, respectively, may be set. In other words, as Q increases, the magnitude of the feedback of the activated UE increases, and a plurality of more and various types of feedback schemes may be set.

Figure 15A:
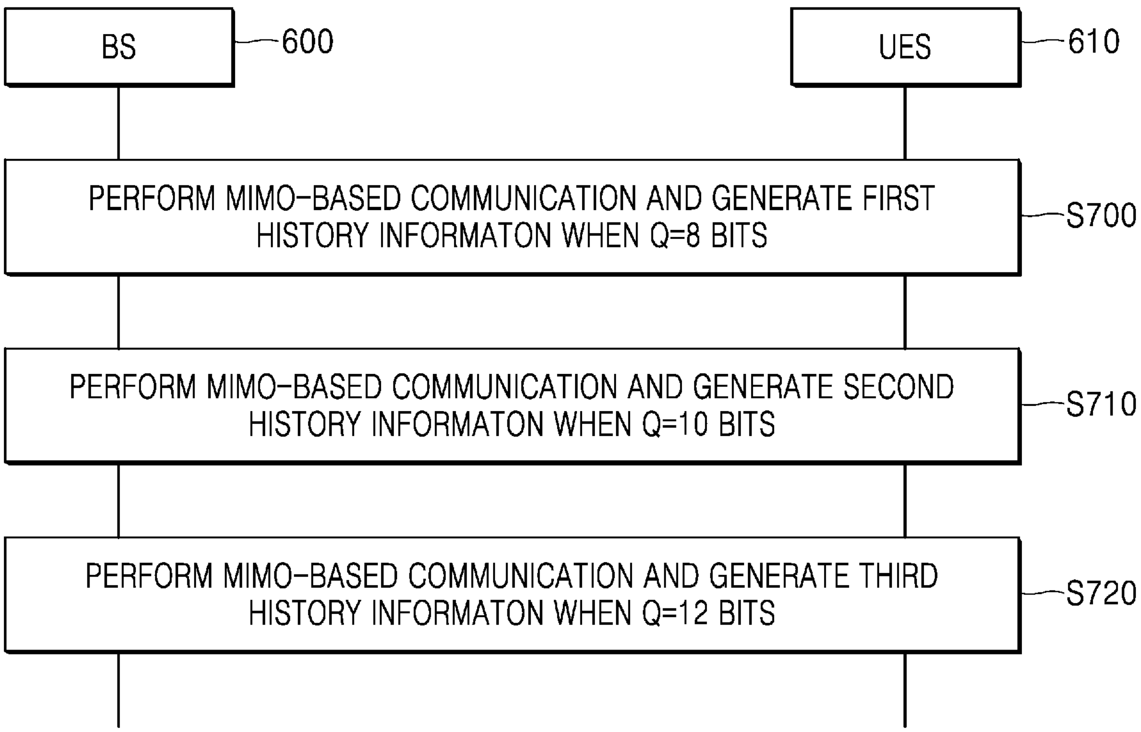
FIG. 15A is a flowchart illustrating a method of generating history information of feedback overhead Q bits of a base station, according to an embodiment.
Figure 15B:
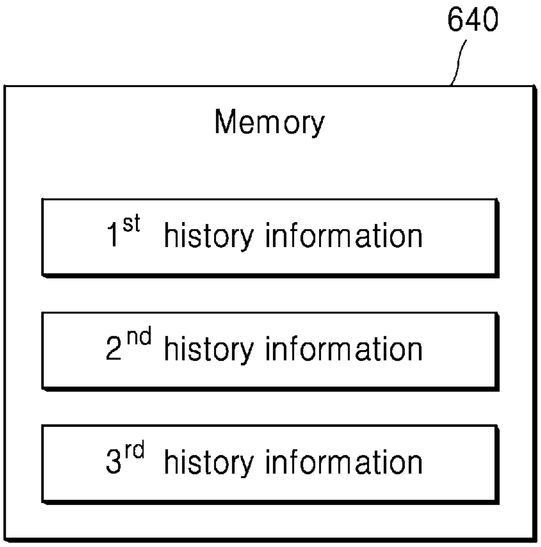
FIG. 15B is a diagram illustrating an embodiment in which first to third history information is stored in a memory.

FIG. 15A is a flowchart illustrating a method of generating history information of feedback overhead Q bits of a base station 600 according to an embodiment, and FIG. 15B is a diagram illustrating an embodiment in which first to third history information is stored in a memory 640.

In FIG. 15A, in operation S700, the base station 600 may perform MIMO communication with activated UEs 610 when Q is 8, and may accumulate data throughputs for each of the plurality of feedback schemes calculated in the process of performing MIMO communication to generate first history information.

In operation S710, the base station 600 may perform MIMO communication with activated UEs 610 when Q is 10, and may accumulate data throughputs for each of the plurality of feedback schemes calculated in the process of performing MIMO communication to generate second history information.

In operation S720, the base station 600 may perform MIMO communication with activated UEs 610 when Q is 12, and may accumulate data throughputs for each of the plurality of feedback schemes calculated in the process of performing MIMO communication to generate third history information.

Although FIG. 15A illustrates that operations S700, S710, and S720 are sequentially performed, the embodiments are not limited thereto. The order of performing operations S700, S710, and S720 may vary according to the order of Q bits selected from the DFS operation of the base station 600.

In FIG. 15B, the base station 600 may store first to third history information generated in a memory 640. Thereafter, the base station 600 may read, from the memory 640, the history information coinciding with the selected Q bit according to the DFS operation, and may perform a feedback scheme selection operation according to embodiments of the present disclosure with reference to the read history information.

Figure 16:
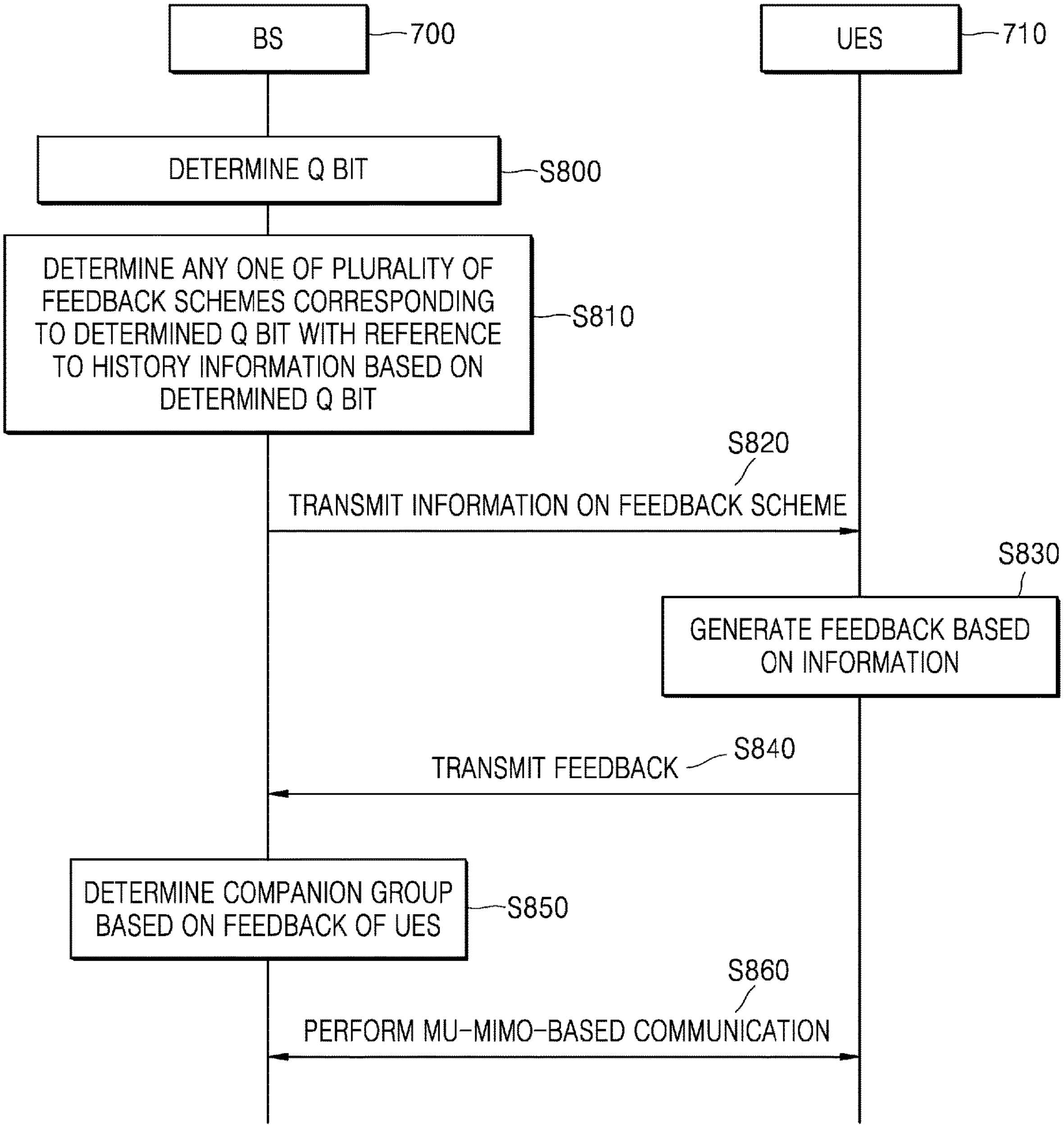
FIG. 16 is a flowchart illustrating a method between a base station and activated UEs according to an embodiment.

FIG. 16 is a flowchart illustrating a method between a base station 700 and activated UEs 710 according to an embodiment. In FIG. 16, in operation S800, the base station 700 may determine a feedback overhead Q bit through a DFS operation. In operation S810, the base station 700 may select any one of a plurality of feedback schemes corresponding to the determined Q bit with reference to history information based on the determined Q bit.

In operation S820, the base station 700 may transmit information on the selected feedback scheme to the activated UEs 710.

In operation S830, each of the activated UEs 710 may generate a feedback based on information.

In operation S840, each of the activated UEs 710 may transmit the generated feedback to the base station 700.

In operation S850, the base station 700 may determine a companion group based on feedback of the activated UEs 710.

In operation S860, the base station 700 may perform MU-MIMO communication with UEs grouped into the companion group. In addition, the base station 700 may perform SU-MIMO communication with UEs that are not grouped into the companion group.

Figure 17:
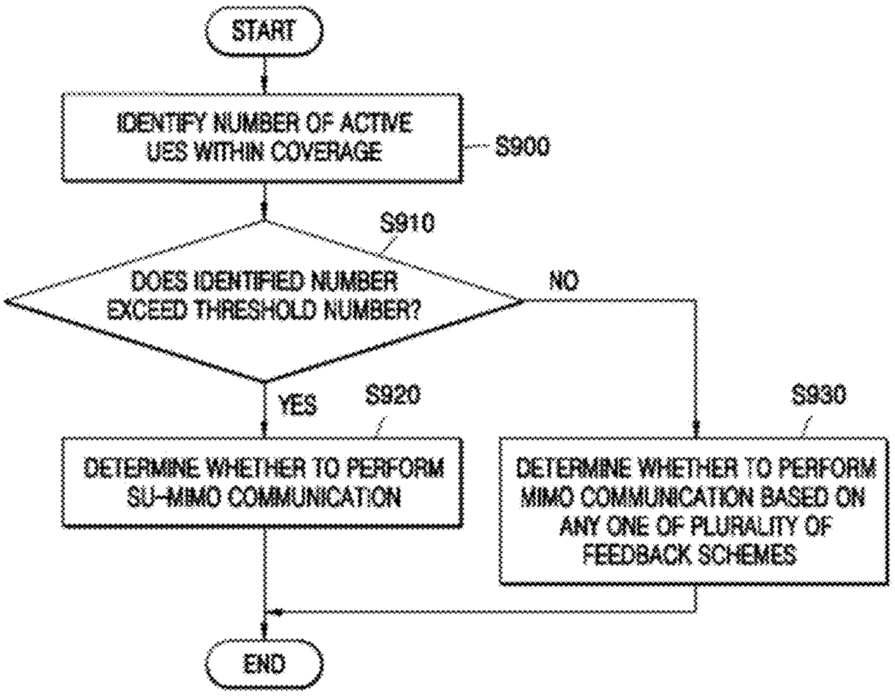
FIG. 17 is a flowchart illustrating a method of a base station according to an embodiment.

FIG. 17 is a flowchart illustrating a method of a base station according to an embodiment. In FIG. 17, in operation S900, the base station may identify the number of activated UEs within a coverage. In operation S910, the base station may determine whether the identified number exceeds a threshold number. When "YES" is determined in operation S910, the base station may determine to perform SU-MIMO communication with the activated UEs. When "NO" is determined in operation S910, the base station may determine to perform MIMO communication based on any one of a plurality of feedback schemes.

In other words, when the number of activated UEs exceeds the threshold number, the base station may collectively perform SU-MIMO communication with the activated UEs, and in this case, only information on the plurality of feedback schemes in cases below the threshold number may be included in the history information.

However, this is only an example, and the embodiments are not limited thereto, and when the number of activated UEs is less than a threshold number, the base station may collectively perform SU-MIMO communication with the activated UEs, and in this case, only the information about the plurality of feedback schemes in the case exceeding the threshold number may be included in the history information.

Figure 18:
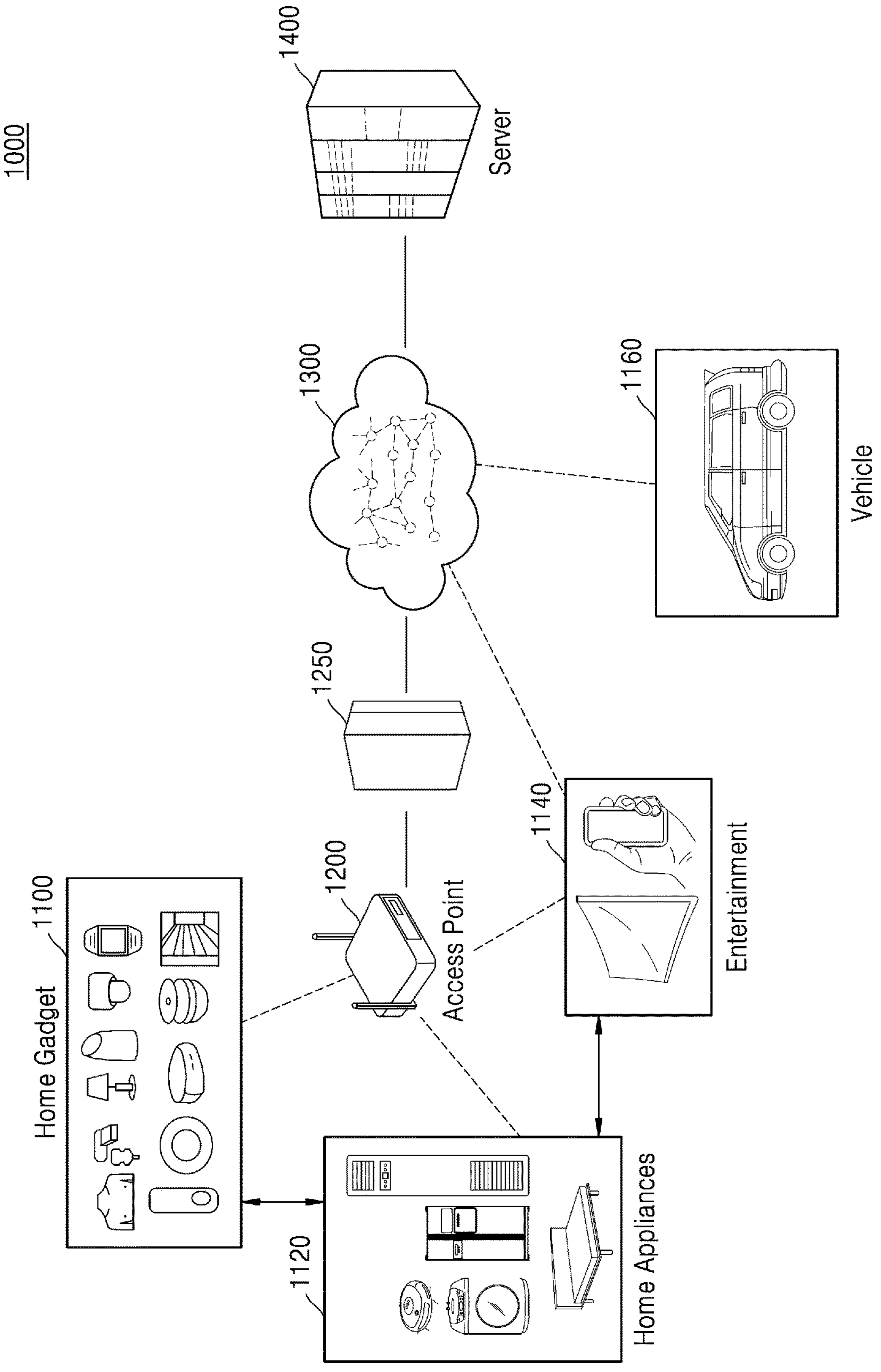
FIG. 18 is a conceptual diagram illustrating an intemet of things (IoT) network system to which embodiments of the present disclosure are applied.

FIG. 18 is a conceptual diagram illustrating an Internet of Things (IoT) network system 1000 to which embodiments of the present disclosure are applied. In FIG. 18, the IoT network system 1000 may include a plurality of IoT devices 1100, 1120, 1140, and 1160, an access point 1200, a gateway 1250, a wireless network 1300, and a server 1400. The IoT may refer to a network between objects using wired/wireless communications.

Each of the IoT devices 1100, 1120, 1140, and 1160 may form a group according to characteristics of each IoT device. For example, IoT devices may be grouped into a home gadget group 1100, a home appliance/furniture group 1120, an entertainment group 1140, a vehicle group 1160, or the like. A plurality of IoT devices 1100, 1120, and 1140 may be connected to a communication network or may be connected to other IoT devices through the access point 1200. The access point 1200 may be embedded in one IoT device. The gateway 1250 may change a protocol to get the access point 1200 to gain access to an external wireless network. The IoT devices 1100, 1120, and 1140 may be connected to an external communication network through the gateway 1250. The wireless network 1300 may include an Internet and/or a public network. A plurality of IoT devices 1100, 1120, 1140, and 1160 may be connected to the server 1400 providing a predetermined service through the wireless network 1300, and a user may use the service through at least one of the IoT devices 1100, 1120, 1140, and 1160.

According to embodiments of the present disclosure, any one of the plurality of IoT devices 1100, 1120, 1140, 1160 may select one of the plurality of feedback schemes, and the others of the plurality of IoT devices 1100, 1120, 1140, and 1160 may generate feedback based on the selected feedback scheme and provide same to any one of the plurality of IoT devices 1100, 1120, 1140, and 1160. The plurality of IoT devices 1100, 1120, 1140, and 1160 may determine a companion group based on feedback and perform MU-MIMO communication with the determined companion group.

While the present disclosure has been particularly shown and described with reference to embodiments thereof, it will be understood that various changes in form and details may be made therein without departing from the spirit and scope of the following claims.

What is claimed is:

1. A method of a base station communicating with a plurality of User Equipments (UEs), the method comprising:
- identifying a number of active UEs from among the plurality of UEs;
- selecting, among a plurality of feedback schemes, a feedback scheme supporting a highest data throughput at the identified number of active UEs with reference to history information;
- determining (i) a number of UEs in a companion group and (ii) a codebook size, the number of UEs in the companion group and the codebook size being corresponding to the selected feedback scheme; and
- performing Multiple Input and Multiple Output (MIMO) communication with the active UEs based on the determined number of UEs in the companion group and the determined codebook size.

2. The method of claim 1, wherein the history information comprises at least one of pass/fail information on the plurality of feedback schemes and accumulated average data throughput of passed feedback schemes by the number of active UEs.

3. The method of claim 2, wherein the selecting the feedback scheme comprises selecting the feedback scheme with the highest value among the accumulated average data throughput of the passed feedback schemes as the feedback scheme supporting the highest data throughput.

4. The method of claim 1, wherein the plurality of feedback schemes comprise:

a first feedback scheme in which the number of UEs in the companion group is defined as a first number and the codebook size is defined as a first size, and a second feedback scheme in which the number of UEs in the companion group is defined as a second number and the codebook size is defined as a second size, wherein, based on the first number that is greater than the second number, the first size is less than or equal to the second size.

5. The method of claim 1, wherein the plurality of feedback schemes comprise a feedback scheme for Single User-MIMO (SU-MIMO) communication with the active UEs.

6. The method of claim 1, wherein:

the performing of MIMO communication with the active UEs comprises transmitting information on the feedback scheme, and the transmitted information on the feedback scheme indicates the number of UEs in the determined companion group and the determined codebook size to the active UEs.

7. The method of claim 1, wherein the performing of MIMO communication with the active UEs comprises receiving a plurality of Precoding Matrix Indicators (PMIs) that belong to a precoding matrix set according to the determined codebook size from each of the active UEs and correspond to the number of UEs in the determined companion group.

8. The method of claim 7, wherein the plurality of PMIs comprise a first PMI indicating a best precoding matrix and at least one second PMI indicating a worst precoding matrix.

9. The method of claim 7, wherein, when the number of UEs in the determined companion group is three, the plurality of PMIs comprise a first PMI determined to be best and two second PMIs determined to be worst.

10. The method of claim 7, wherein the performing of communication with the active UEs comprises:

grouping the active UEs into the companion group based on the plurality of PMIs received from each of the active UEs; and performing Multiple User-MIMO (MU-MIMO) communication for the companion group.

11. The method of claim 1, further comprising generating the history information, wherein the generating of the history information comprises:

accumulating data throughput based on the plurality of feedback schemes by the number of active UEs; and generating the history information based on the accumulated data throughput.

12. The method of claim 11, wherein the accumulating of the data throughput comprises:

determining Modulation And Coding Scheme (MCS) levels based on the plurality of feedback schemes by the number of active UEs; and calculating, based on the determined MCS levels, the data throughput according to the plurality of feedback schemes.

13. The method of claim 1, further comprising determining a Q bit, which is feedback overhead, wherein a number and a type of the plurality of feedback schemes correspond to the determined Q bit.

14. The method of claim 13, further comprising transmitting information indicating the determined Q bit to the active UEs.

15. The method of claim 13, wherein the history information corresponds to the determined Q bit.

16. The method of claim 1, further comprising:

determining whether the identified number exceeds a threshold number; and selecting, based on the identified number that exceeds the threshold number, a feedback scheme for Single User-MIMO (SU-MIMO) communication with the active UEs from among the plurality of feedback schemes.

17. A method of a User Equipment (UE) communicating with a base station, the method comprising:

receiving, from the base station, information about a feedback scheme selected by the base station based on a number of active UEs within coverage and history information for a plurality of feedback schemes;

generating at least one Precoding Matrix Indicator (PMI) belonging to a precoding matrix set corresponding to a codebook size coinciding with the feedback scheme selected by the base station, and corresponding to a number of active UEs coinciding with the feedback scheme selected by the base station;

generating a Channel Quality Indicator (CQI) corresponding to the at least one PMI; and transmitting channel state information including the at least one PMI and the CQI to the base station.

18. The method of claim 17, wherein the larger the number of active UEs corresponding to the feedback scheme, the smaller the codebook size corresponding to the feedback scheme.

19. A device comprising:

a transceiver configured to transmit and receive a Radio Frequency (RF) signal with respect to a plurality of active User Equipments (UEs) within coverage; and a processor configured to select a feedback scheme expected to support a highest data throughput in the number of the plurality of active UEs with reference to history information of a plurality of feedback schemes, and control the transceiver to perform Multiple Input and Multiple Output (MIMO) communication with the plurality of active UEs based on the selected feedback scheme.

20. The device of claim 19, wherein each of the plurality of feedback schemes is defined as a number of UEs in a companion group related to multiple user-MIMO (MU-MIMO) and a codebook size.

* * * * *